(12) United States Patent
Sharma et al.

(10) Patent No.: US 11,672,194 B2
(45) Date of Patent: Jun. 13, 2023

(54) MACHINE-LEARNED TILLAGE PLUG DETECTION IN AN AUTONOMOUS FARMING VEHICLE

(71) Applicant: Blue River Technology Inc., Sunnyvale, CA (US)

(72) Inventors: Divya Sharma, San Jose, CA (US); Michael Albert Elcano, Bakersfield, CA (US); Byron Gajun Ho, Fremont, CA (US); Jeremy Douglas Krantz, Polk City, IA (US); Tyler Niday, Santa Cruz, CA (US); Robert Joseph Plumeau, San Jose, CA (US)

(73) Assignee: BLUE RIVER TECHNOLOGY INC., Sunnyvale, CA (US)

( * ) Notice: Subject to any disclaimer, the term of this patent is extended or adjusted under 35 U.S.C. 154(b) by 222 days.

(21) Appl. No.: 17/126,764

(22) Filed: Dec. 18, 2020

(65) Prior Publication Data
US 2022/0192076 A1   Jun. 23, 2022

(51) Int. Cl.
*A01B 79/00* (2006.01)
*G06N 20/00* (2019.01)
(Continued)

(52) U.S. Cl.
CPC ......... *A01B 79/005* (2013.01); *G05D 1/0088* (2013.01); *G06N 20/00* (2019.01);
(Continued)

(58) Field of Classification Search
CPC .......... A01B 79/005; A01B 3/24; G06T 7/70; G06T 7/0002; G06T 2207/20081;
(Continued)

(56) References Cited

U.S. PATENT DOCUMENTS

2020/0107490 A1* 4/2020 Zemenchik ........... A01B 63/111
2020/0344939 A1* 11/2020 Sporrer ................. A01B 41/06
(Continued)

FOREIGN PATENT DOCUMENTS

EP           3837935 A1    6/2021
WO    WO 2021/089813 A2    5/2021

OTHER PUBLICATIONS

PCT International Search Report and Written Opinion, PCT Application No. PCT/US2021/057906, dated May 11, 2022, 24 pages.

*Primary Examiner* — Mahmoud S Ismail
(74) *Attorney, Agent, or Firm* — Fenwick & West LLP

(57) ABSTRACT

A detection system detects malfunctions in an autonomous farming vehicle during an autonomous routine using one or more models and data from sensors coupled to the autonomous farming vehicle. The models may include machine-learned models trained on the sensor data and configured to identify objects indicative of an operational or malfunctioning component within a tilling assembly such as a tilling shank or sweep. Additionally, a machine-learned model may be trained on sensor data to detect whether debris has plugged the tilling assembly of the autonomous farming vehicle. In response to detecting a malfunction or a plug, the detection system may modify the autonomous routine (e.g., pausing operation) or provide information for the malfunction to be addressed (e.g., the likely location of a malfunctioning sweep that has detached from the tilling assembly).

21 Claims, 14 Drawing Sheets

(51) Int. Cl.
  *G05D 1/00* (2006.01)
  *G06T 7/00* (2017.01)
  *G06T 7/70* (2017.01)
  *A01B 3/24* (2006.01)
(52) U.S. Cl.
  CPC .............. *G06T 7/0002* (2013.01); *G06T 7/70* (2017.01); *A01B 3/24* (2013.01); *G05D 2201/0201* (2013.01); *G06T 2207/20081* (2013.01); *G06T 2207/30188* (2013.01); *G06T 2207/30252* (2013.01)
(58) Field of Classification Search
  CPC .......... G06T 2207/30188; G06T 2207/30252; G06N 20/00; G05D 1/0088; G05D 2201/0201
  USPC .......................................................... 701/28
  See application file for complete search history.

(56) References Cited

U.S. PATENT DOCUMENTS

| | | | |
|---|---|---|---|
| 2021/0029865 A1* | 2/2021 | Smith | A01B 63/24 |
| 2021/0045278 A1* | 2/2021 | Henry | A01B 63/112 |
| 2021/0108951 A1* | 4/2021 | Smith | A01B 25/00 |
| 2021/0192294 A1* | 6/2021 | Stanhope | G06K 9/6268 |

\* cited by examiner

MACHINE-LEARNED TILLAGE PLUG DETECTION IN AN AUTONOMOUS FARMING VEHICLE

This disclosure relates generally to a detection system for autonomous farming vehicles, and more specifically to detecting malfunctions within a tilling assembly of an autonomous farming vehicle.

BACKGROUND

Tilling serves to break up soil and introduce organic matter into the soil to improve crop growth, control weeds, or loosen soil for planting crops. The condition of the farming environment and equipment are factors that affect the quality of tilling. Environmental factors such as weather affect the moisture level of the soil being tilled, which may affect the likelihood that the equipment malfunctions. Equipment malfunctions reduce the quality of the tilling by, for example, failing to reach a depth in the soil for desired tilling routine.

Tilling may be done using a tilling assembly drawn by an automated farming vehicle. For example, an automated tractor may pull a chisel plow through the earth to till the soil. For automated farming, farmers may monitor their vehicles and farming equipment to avoid improperly tilled fields or to prevent their equipment from being damaged. In existing systems in the art, a plow may malfunction during tilling: components of the plow may detach or be displaced (e.g., a coupling mechanism loosens during operation) from the plow or debris may plug the plow. Detached components may be left behind in the soil, damaging vehicles that subsequently encounter them. Plugs within the plow may change the tilling pattern produced by the plugged plow, reducing the quality of the tilling. Accordingly, existing systems may be improved by monitoring the tilling assembly and detecting malfunctions during the autonomous routine.

SUMMARY

The detection system described herein detects malfunctions in an autonomous farming vehicle during an autonomous routine using one or more models and data from sensors coupled to the autonomous farming vehicle. The models may include machine-learned models trained on the sensor data and configured to identify objects indicative of an operational or malfunctioning component within a tilling assembly such as a tilling shank or sweep. By using computational or statistical models to detect malfunctions, the detection system increases the opportunities to detect malfunctions, the rate at which malfunctions can be detected, and the overall quality of routines performed by an autonomous farming vehicle.

The detection system may continuously monitor for malfunctions under various conditions that would otherwise be difficult for manual monitoring. For example, the detection system may continue to detect loose or missing shanks when the availability of natural light is low. Furthermore, the detection system may monitor for malfunctions at a rate commensurate with the rate at which sensor data is collected, which may be faster and more detailed than the observational speed of manual collection. Because the rate of detections may be greater and the quality of detections may be more accurate, the opportunities to address the malfunctions with an appropriate resolution increases. The detection system may determine the appropriate resolution during the operation of the autonomous farming vehicle or provide a recommendation for reducing malfunctions to a user. Accordingly, malfunction detection is improved, the opportunities to address the malfunctions increases, and the quality of the autonomous routine performed by the autonomous farming vehicle increases.

In one embodiment, the detection system accesses, in real-time or substantially real-time, image data corresponding to and representative of a state of each of a set of tilling shanks as an autonomous farming vehicle pulls the tilling shanks through earth while performing an autonomous routine. The accessed image data may be captured by a camera located on the autonomous farming vehicle such as a monochrome camera. A machine-learned model may be applied to the image data to identify a malfunctioning tilling shank. The machine-learned model may be trained on training image data representative of operational and malfunctioning tilling shanks. The machine-learned model is configured to classify whether a tilling shank is operational or malfunctioning based on the accessed image data. For example, a monochrome camera captures light reflected off of reflective markers, each marker coupled to a tilling shank, where the shape of the reflected light is dependent on whether the corresponding tilling shank is operational or malfunctioning. The machine-learned model may be trained to classify the shape of the reflected light and identify a malfunctioning shank from an operational shank. In response to a tilling shank being classified as malfunctioning, the detection system may modify the autonomous routine of the autonomous farming vehicle (e.g., pausing the autonomous routine for a user to fix the malfunctioning shank).

In an additional embodiment, the detection system accesses, in real-time or substantially real-time, thermal sensor data corresponding to and representative of each of a set of below-ground tilling sweeps as an autonomous farming vehicle pulls the tilling sweeps through earth while performing an autonomous routine. The accessed thermal sensor data may be captured by a camera of the autonomous farming vehicle such as a thermal camera. A machine-learned model may be applied to the image data to identify a malfunctioning tilling sweep. The machine-learned model may be trained on training thermal sensor data representative of operational and malfunctioning below-ground tilling sweeps. The machine-learned model is configured to detect a malfunctioning sweep based on the accessed thermal sensor data. When a malfunctioning tilling sweep is detected, the detection system may determine a geographic location of the malfunctioning tilling sweep (e.g., via a GPS tracking unit) and flag the location for subsequent retrieval of the tilling sweep (i.e., the malfunction is that the sweep detached from a corresponding shank). The detection system may also pause the autonomous routine after the malfunctioning tilling sweep is detected.

In a further embodiment, the detection system accesses, in real-time or substantially real-time, image data corresponding to a tilling pattern produced by an autonomous farming vehicle as it pulls tilling shanks through earth while performing an autonomous routine. The accessed image data may be captured by a video camera located on the autonomous farming vehicle. A machine-learned model may be applied to the image data to identify plugged tilling shanks. The machine-learned model may be trained on training image data representative of tilling patterns produced by unplugged shanks and plugged shanks. The machine-learned model is configured to detect a plug based on the image data corresponding to the tilling pattern produced by the autonomous farming vehicle. For example, a video camera captures images of tilling patterns produced by a plugged tilling assembly. The machine-learned model may be trained to classify patterns produced by plugged tilling assemblies and detect that the tilling assembly is presently plugged. In response to detecting a plug, the detection system may modify the autonomous routine of the autonomous farming vehicle (e.g., pausing the autonomous routine for a user to fix the malfunctioning shank).

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
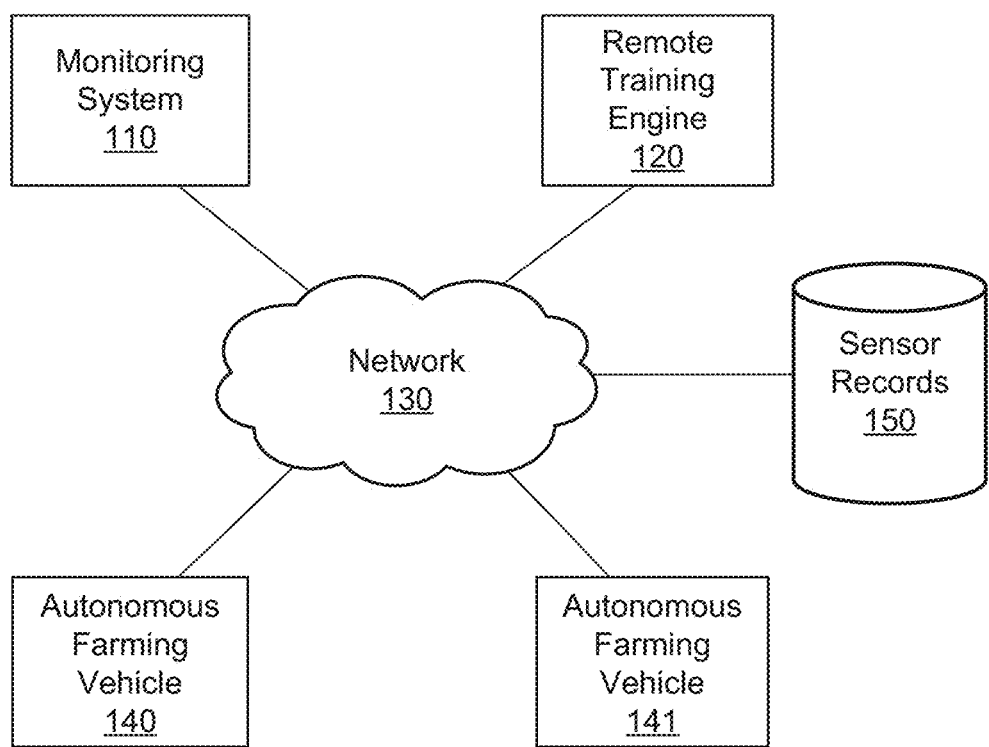
FIG. 1 is a block diagram of a system environment in which autonomous farming vehicles operate, in accordance with at least one embodiment.

FIG. 1 is a block diagram of a system environment 100 in which autonomous farming vehicles 140 and 141 operate. The system environment 100 shown by FIG. 1 includes a monitoring system 110, a remote training engine 120, a network 130, the autonomous farming vehicles 140 and 141, and the sensor records 150. The system environment 100 may have alternative configurations than shown in FIG. 1, including for example different, fewer, or additional components. For example, the system environment 100 may include a local network between the autonomous farming vehicles 140 and 141 to communicate directly with one another (e.g., if the vehicles are offline from the network 130).

The monitoring system 110 enables the monitoring and control of autonomous farming vehicles performing autonomous routines. In some embodiments, the monitoring system 110 enables a user to monitor their autonomous farming vehicles by receiving data from the vehicles and providing the data for display or evaluating the data to assess the performance of the autonomous farming vehicles. The monitoring system 110 may receive data from autonomous farming vehicles associated with a single user or farm or from autonomous farming vehicles across a general group of users or farms (e.g., to provide performance evaluations relative to other vehicles' performances). In some embodiments, the monitoring system 110 enables the control of the vehicles by providing users an interface through which to start, modify, pause, or end the autonomous routines performed by the vehicles or modify the operation of the vehicles that are performing the routines. For example, the monitoring system 110 may generate a notification that a malfunction has been detected for a particular vehicle and provide the user a prompt to pause the operation of the vehicle.

The monitoring system 110 may provide evaluations of data aggregated from autonomous farming vehicles. In some embodiments, the monitoring system 110 provides recommendations to modify the autonomous routines or the autonomous farming vehicles based on the evaluated data. For example, the monitoring system 110 may use statistical models to determine a correlation between properties of the autonomous farming vehicles during operation (e.g., speed, duration of operation for a single routine, etc.) and a property associated with malfunction (e.g., a type of malfunction, a location of malfunction, a number of malfunctions, etc.). Using a statistical model and the data received from the vehicles, the monitoring system 110 may determine a recommendation that the speed of the vehicles be reduced to decrease the likelihood that a malfunction (e.g., a shank is displaced) occurs. The monitoring system 110 may determine statistical models that factor in various parameters associated with automated farming routines such as properties of the farming vehicles during operation, the farming equipment used, the farming environment (e.g., crops grown, climate, etc.), any suitable parameter characterizing the conditions under which automated farming routines are performed, or a combination thereof. The statistical models may be generated based on parameters associated with a single farm or generalized across multiple farms. For example, the monitoring system 110 may provide a recommendation to a given user based on the quality of automated farming tasks performed across multiple farms.

The monitoring system 110 may be a remote server or computing device. For example, the monitoring system 110 may be a software application that is executed by a user's mobile device that is communicatively coupled to the autonomous farming vehicles 140 and 141 via the network 130. In some embodiments, the monitoring system 110 is located on-vehicle. For example, the monitoring system 110 may be a software application stored and executed on the autonomous farming vehicle 140. The monitoring system 110 may enable the monitoring and control of the vehicles via a graphical user interface (GUI). The monitoring system 110 may generate the GUIs for display on a user device. Examples of GUIs that the monitoring system 110 may generate are described in the descriptions of FIGS. 13-15.

The remote training engine 120 trains machine learning models for use in detecting malfunctions in the autonomous farming vehicle operations. For example, the remote training engine 120 may train machine learning models to identify sweeps or shanks within images of a tilling assembly having sweeps and shanks. The identified count may be used to determine if there has been a malfunction during the autonomous routines. The remote training engine 120 may be a remote server or computing device that trains machine learning models for use remotely (e.g., by the monitoring system 110) or provides the models to be stored and used by the autonomous farming vehicles. Although depicted as a separate component, the remote training engine 120 may be integrated into an existing component of the system environment 100 (e.g., it is a subcomponent of the monitoring system 110 that runs on the same server or computing device). The training of machine learning models for detecting malfunctions is described further in the descriptions of FIG. 3's machine learning model training engine 310, a component of the detecting system 210 local to an autonomous farming vehicle. Training may be performed at either engine 120 or 310. For example, if the autonomous farming vehicle is offline from the network 130, the machine learning model training may be performed at the machine learning model training engine 310.

The network 130 may serve to communicatively couple the monitoring system 110, the remote training engine 120, the autonomous farming vehicles 140 and 141, and the sensor records 150. In some embodiments, the network 130 includes any combination of local area and/or wide area networks, using wired and/or wireless communication systems. The network 130 may use standard communications technologies and/or protocols. For example, the network 130 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 110 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network 130 may be encrypted using any suitable technique or techniques.

The autonomous farming vehicles 140 and 141 perform automated farming routines such as tilling a field. The autonomous farming vehicles 140 and 141 may receive instructions from a user (e.g., from the monitoring system 110) over the network 130. The vehicles 140 and 141 may be equipped with farming equipment such as a tilling assembly with shanks and sweeps. The detection system as described herein may operate onboard the vehicles 140 and 141 to determine whether a malfunction has occurred during the vehicles' operation. Sensors on the vehicles 140 and 141 provide data for the detection system to identify malfunctions using one or more models (e.g., machine-learned or statistical models). The vehicles 140 and 141 may be further equipped with one or more processors and wireless communications circuitry to perform the automated farming routines and the operations of the detection system. The autonomous farming vehicle is further described in the description of FIG. 2.

The sensor records 150 is a storage for data collected by sensors on autonomous farming vehicles. The sensor records 150 may be located on a remote server or computing device. Data collected by autonomous farming vehicle sensors may include images, video, or textual data representative of the operational of the autonomous farming vehicle or the autonomous routine performed by the vehicle. For example, image or video data may depict a tilling assembly coupled to the vehicle as the tilling assembly is pulled through the earth to till a field. The sensor records 150 may be accessed by the remote training engine 120 to train a machine-learned model used by the detection system described herein. For example, the data may be used to train a machine learning model to identify sweeps of a tilling assembly to determine whether there is a malfunction (e.g., a missing sweep) within the tilling assembly. The sensor records 150 may also be accessed by the monitoring system 110 for presentation to a user or for evaluating trends associated with malfunctions detected.

Figure 2:
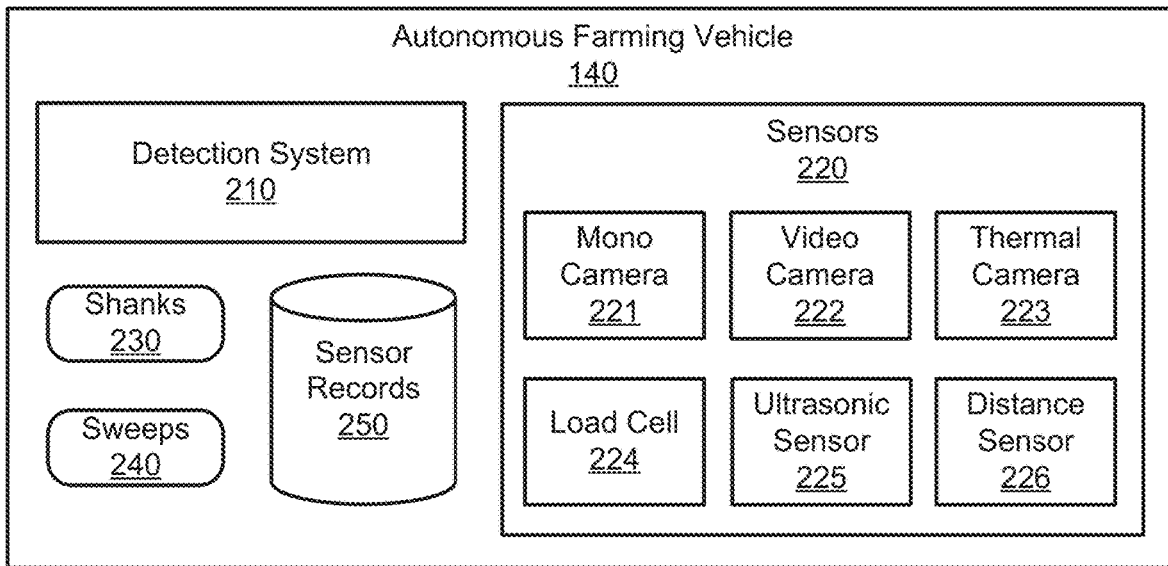
FIG. 2 is a block diagram of an autonomous farming vehicle of FIG. 1, in accordance with at least one embodiment.

FIG. 2 is a block diagram of the autonomous farming vehicle 140 of FIG. 1. The autonomous farming vehicle 140 includes a detection system 210, sensors 220, shanks 230, sweeps 240, and sensor records 250. The sensors 220 further include a monochrome ("mono") camera 221, a video camera 222, a thermal camera 223, a load cell 224, an ultrasonic sensor 225, and a distance sensor 226. The autonomous farming vehicle 140 may have alternative configurations than shown in FIG. 2, including for example different, fewer, or additional components. For example, the autonomous farming vehicle 140 may include wireless communications circuitry for communicating detected malfunctions with the monitoring system 110, sensor data for storage at the sensor records 150, or instructions to another autonomous farming vehicle in the vicinity (e.g., to notify the vehicle to avoid a certain area of the farm with a shank that has fallen off of the tilling assembly and has been misplaced in the soil). In another example, the sensors 220 may include additional or fewer sensors such as an additional RGB camera or through-beam sensor.

The detection system 210 detects malfunctions in the equipment (e.g., tilling assembly) of the autonomous farming vehicle 140. In some embodiments, the detection system 210 uses machine-learned models or statistical models to determine a likelihood of malfunction in the equipment. For example, a statistical model identifies a correlation between data received by the load cells 224 of the sensors 220 and a likelihood of a malfunctioning shank by comparing a change in drawbar pull associated with pulling the tilling assembly through soil. The detection system 210 may train the machine-learned models in addition to or as an alternative to training by the remote training engine 120. The detection system 210 may receive data from the sensors 220 that may be stored in the sensor records 250 or receive data stored in the sensor records 150. The detection system 210 may preprocess data for input into a model. For example, the detection system uses digital signal processing techniques, such as temporal filtering, to attenuate noise that may be highly variant. The detection system 210 may input the data received from sensors or the preprocessed data into a model to determine whether the equipment of the autonomous farming vehicle 140 malfunctioned or if an unwanted object or residue pile has plugged the equipment. In some embodiments, the detection system 210 determines a degree to which the autonomous farming vehicle 140 performed its job (i.e., the job quality). The detection system 210 is further described in the description of FIG. 3.

The sensors 220 collect data representative of the autonomous farming vehicle's operation and progress of the autonomous routine. A sensor of the sensors 220 may be an electrical, mechanical, thermal, or radio frequency sensor, or any suitable sensor for measuring the operation of an autonomous farming vehicle or the autonomous routine performed by the autonomous farming vehicle. The sensors 220 include cameras such as the mono camera 221, the video camera 222, and the thermal camera 223 for collecting images or video of the vehicle or the field. Additional sensors for collecting images or video, although not depicted in FIG. 2, include an RGB camera or a 3D stereo camera. Although only one sensor of a particular type is depicted in FIG. 2, the autonomous farming vehicle 140 may be equipped with more than one of a given sensor.

The sensors 220 may include additional, fewer, or different sensors than depicted in FIG. 2. For example, a 3D camera may be included within the sensors 220 to determine the distance or depth from the 3D camera to a shank of the tilling assembly. The detection system 210 may compare depths measured by the 3D camera against an expected or predetermined depths to determine whether a tilling shank is malfunctioning. In one example, the measured depth is greater than expected when the tilling shank is missing because the camera is measuring the distance to the soil rather than the expected distance to the shank. In another example, the system 210 compares depths corresponding to the texture of the soil. That is, the smoothness or uniformity of the tilled soil is measured using the depth information captured by the 3D camera to determine whether equipment (e.g., a tilling shank) has malfunctioned or the quality of the tilling job is below a certain quality threshold.

In another example, a draw wire sensor may be included within the sensors 220 to determine the presence of a plug that has broken the draw wire or a missing shank that has broken the draw wire as it decoupled from the tilling assembly. In some embodiments, the tilling shanks may be coupled to respective radio frequency identification (RFID) tags. The RFID tags enable the detection system 210 to track the locations of the tilling shanks. The detection system 210 may determine whether a tilling shank is malfunctioning based on the locations of the tilling shank as indicated by its RFID tag. An RFID tag that is located at greater than a threshold distance away from the autonomous farming vehicle 140 or the other RFID tags of the tilling assembly is an indication that the shank may have fallen off the tilling assembly.

The mono camera 221 may detect reflectors or markers coupled to components of the farming equipment. For example, reflective markers are coupled to the shanks 230 of a tilling assembly towed by the autonomous farming vehicle 140. Light reflecting from the markers may be captured by the mono camera 221 to indicate the presence or position of the shanks 230. In some embodiments, an RGB camera may detect reflectors coupled to the farming equipment in addition or as an alternative to the mono camera 221. For example, the RGB camera captures the outline of reflected light off of the reflectors to indicate the presence or position of the shanks 230.

In some embodiments, a 3D stereo camera may be used to detect for the presence of reflectors coupled to the farming equipment. The 3D stereo camera may measure the depth from the camera to a reflector to determine whether the reflector is properly positioned, which in turn, may indicate whether a tilling shank is properly functioning. For example, the 3D stereo camera may measure depths to the reflector, which may be compared, by the detection system 210, to a threshold range of depths corresponding to a functioning or malfunctioning shank.

The video camera 222 may capture the state of the field or the equipment as the autonomous farming vehicle 140 is performing its autonomous routine. For example, the video camera 222 is rear-facing and positioned to capture images or video of the tilling streaks in the soil, the count of which may be associated with the number of shanks or sweeps in the tilling assembly. A rear-facing video camera may capture tire tracks in the soil created by the autonomous farming vehicle 140. For example, the video camera 222 may capture the tire tracks in the soil that a tilling assembly of the autonomous farming vehicle 140 has not yet created tilling streaks in. The image data capturing the tire tracks may be used to compare against the patterns in soil that both the tilling assembly and the tires of the autonomous vehicle 140 have modified to distinguish tire tracks from tilling streaks.

In some embodiments, a front-facing video camera may be used to capture the state of a field before the autonomous farming vehicle 140 tills the field. The front-facing video camera's data may be used to compare against the tilling pattern captured by the rear-facing video camera 222. The detection system 210 (e.g., the job quality assessment module 330) may determine the quality of the tilling job based on the comparison.

Figure 9:
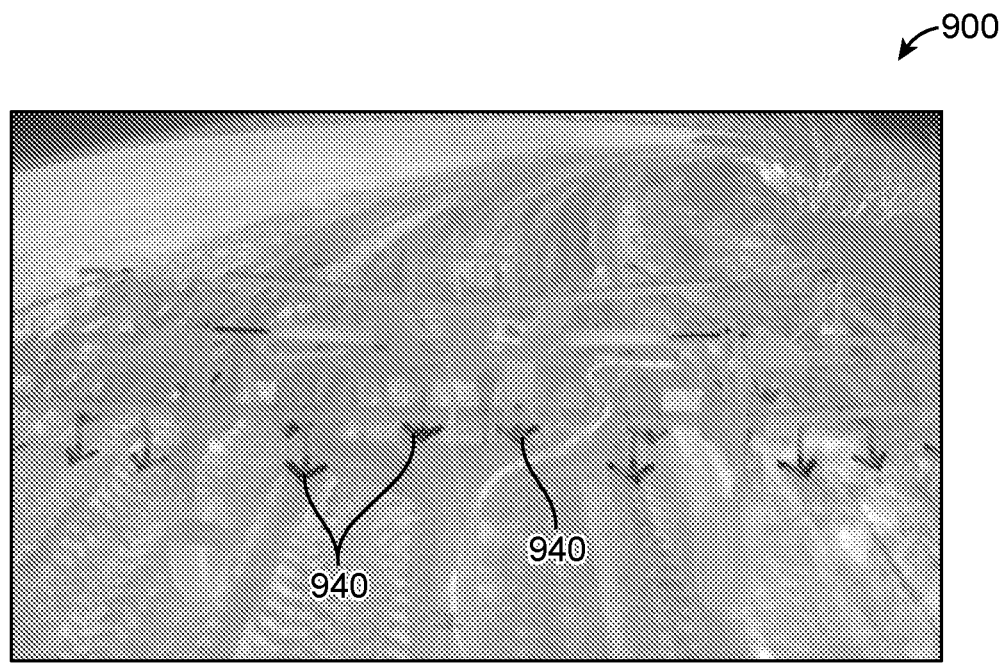
FIG. 9 depicts thermal sensor data capturing sweeps of a tilling assembly, in accordance with at least one embodiment.
Figure 10:
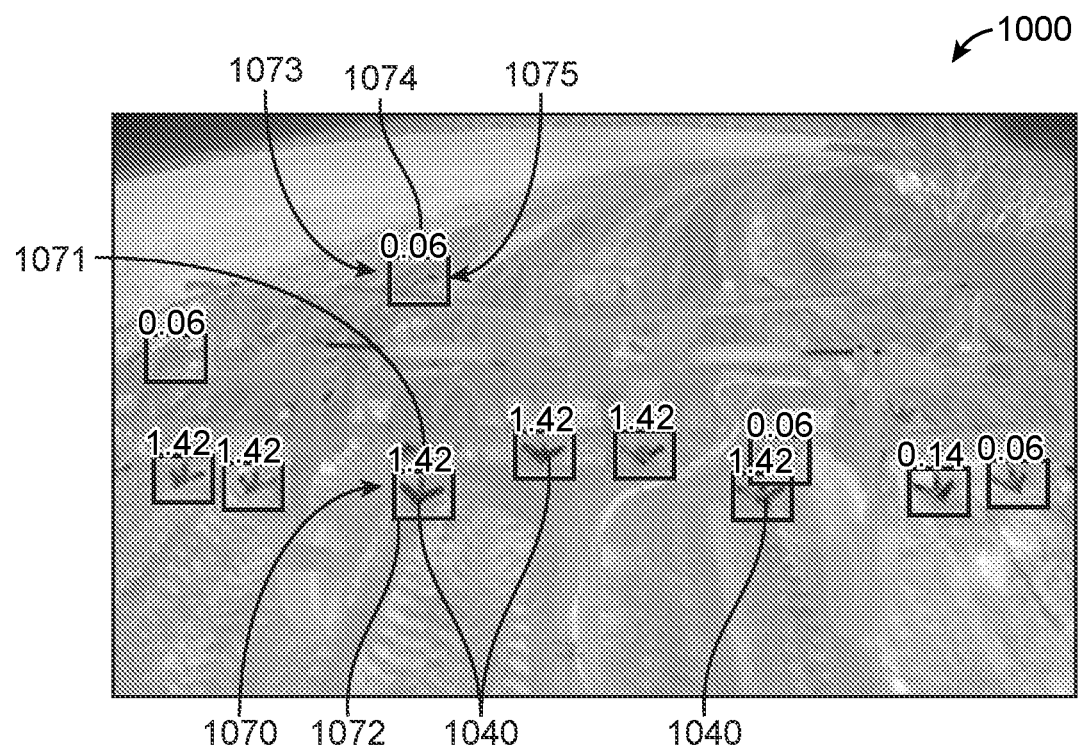
FIG. 10 is a visualization of identified sweeps by the detection system of FIG. 3, in accordance with at least one embodiment.

In another example, the video camera 222 may capture images or video of the tilling assembly, which may be processed to identify a count of the shanks 230 presently coupled to the autonomous farming vehicle 140. The thermal camera 223 may capture relative temperatures of objects within its field of view, including the sweeps 240 that may be underground as the autonomous farming vehicle 140 is performing its autonomous routine. An example of thermal sensor data captured by a thermal camera is depicted in FIGS. 9-10 and described in the corresponding descriptions.

The sensors 220 include one or more load cells 224 for measuring a draft force associated with pulling the tilling assembly through the earth. The sensors 220 includes an ultrasonic sensor 225 for measuring the distance from the sensor 225 and an object. For example, the sensor 225 may output data corresponding to a measure of the travel time of sound wave transmitted by and reflected back to the sensor 225 (e.g., reflected off of a tilling shank). The sensors 220 may include a through-beam sensor and the distance sensor 226 for sensing the presence of an object within the light of sight of the sensors. The through-beam sensor may output data corresponding to a measure of a signal (e.g., the amplitude) received by a receiver of the through-beam sensor, where the signal is transmitted by an emitter of the through-beam sensor. The detection system 210 may use the measure of this signal to determine whether there is a plug between shanks (e.g., by comparing the measure to a threshold measure). In some embodiments, the distance sensor 226 may be used to determine that an unwanted object is plugging the tilling assembly or that a shank has been displaced from the tilling assembly. The application of the sensors 220 will be further described in the descriptions of FIGS. 6-12.

The shanks 230 and the sweeps 240 are components of a tilling assembly that is coupled to the autonomous farming vehicle 140. Examples of shanks and sweeps that may be used to till a field by the vehicle 140 are described in the descriptions of FIGS. 4-5.

The sensor records 250 is a storage for data collected by the sensors 220 of the autonomous farming vehicle 140. The detection system 210 may transmit data from the sensor records 250 to the remote sensor records 150 for access by other users or to train a generalized model on data from a variety of autonomous farming vehicles. The data in the sensor records 250 may be accessed by the machine learning model training engine 310 to train a machine learning model to identify a target object. For example, the data may be used to train a machine-learned model of the plug detection model to identify tilling patterns produced by tilling assemblies with plugs located between shanks by the presence of scarring on the field finish. The sensor records 250 may also be accessed by the monitoring system 110 for presentation to a user or for evaluating trends associated with malfunctions detected.

Detection System

Figure 3:
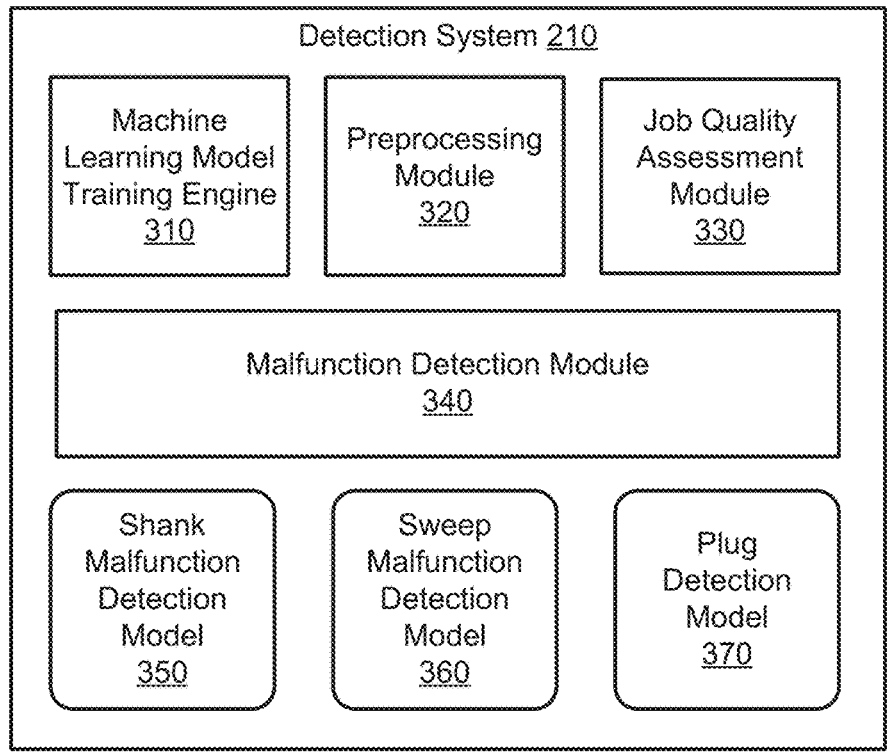
FIG. 3 is a block diagram of a detection system of the autonomous farming vehicle of FIG. 2, in accordance with at least one embodiment.

FIG. 3 is a block diagram of the detection system 210 of the autonomous farming vehicle of FIG. 2. The detection system 210 includes a machine learning model training engine 310, a preprocessing module 320, a job quality assessment module 330, a malfunction detection module 340, a shank malfunction detection model 350, a sweep malfunction detection model 360, and a plug detection model 370. The detection system 210 may have alternative configurations than shown in FIG. 3, including for example different, fewer, or additional components. For example, the detection system 210 may include an additional module for modifying the operation of the autonomous farming vehicle based on a detected malfunction (e.g., pausing operation or changing the route which the autonomous farming vehicle follows).

The machine learning model training engine 310 trains machine learning models of the detection system 210 to identify indications of malfunction using different types of data sets. Some data types can be associated with a different types of sensors used to collect the data. For example, video data from the video camera 222 depicting tilling streaks in soil may be labeled with the number of tilling streaks and used to generate a training set to train the shank malfunction detection model 350 to determine the number of streaks in the soil, where the number of streaks may correspond to the number of shanks properly coupled to the tilling assembly. Some data types may be associated with the generality of the data. For example, data from multiple farms with varying environmental conditions (e.g., different climates) can be used to train a machine learning model for generalized use, and the model may be retrained for optimized application to a particular farm's climate.

The machine learning model training engine 310 may create training sets based on data from the sensor records 150 or 250. To create a training set, the machine learning model training engine 310 may determine one or more feature vectors associated with a combination of different types of sensor data. For example, the training engine 310 may determine a feature vector characterizing data from both the mono camera 221, the mono camera data representative of a number of reflective markers coupled to the shanks 230, and the video camera 222, the video camera data representative of a number of tilling streaks produced by the shanks 230 as they are pulled through soil. The training set may be labeled with an identified number of objects represented in the data. For example, the mono camera and video camera data may be associated with a shank that has displaced from the tilling assembly and accordingly, the data is labeled to identify the malfunctioning shank. The data may be labeled with a number of malfunctioning sweeps or shanks, a number of plugs within the tilling assembly, a location of a malfunctioning sweep or shank (e.g., a relative position within the tilling assembly), or a location of a plug within the tilling assembly (e.g., identifying the shanks the plug is in contact with).

In some embodiments, the machine learning model training engine 310 trains a machine learning model in multiple stages. In a first stage, the training engine 310 may use generalized data collected across one or more farming environments (e.g., differing climates), one or more farming equipment types (e.g., tilling assemblies using shanks with differing sweeps types), or a combination thereof to train the machine learning model. The generalized data may be labeled with a number of identified target objects. For example, the imaging data collected across multiple farms and equipment types may be labeled with a number of shanks present within the tilling assemblies associated with the generalized data. The training engine 310 then creates a first training set based on the labeled generalized data. The training engine 310 trains a machine learning model, using the first training set, to identify a target object. That is, the machine learning model is configured to receive, as an input, data collected from the sensors 220 and output classifications of objects represented through the generalized data. The data collected from the sensors 220 may be preprocessed by the preprocessing module 320 prior to being input into a trained model.

In a second stage of training, the machine learning model training engine 310 may use data collected by the sensors 220 to optimize models to the conditions associated with the autonomous farming vehicle 140. The training engine 310 creates a second training set based on the data from the sensors 220 and labels identifying target objects represented by the data. Furthermore, the second training set may be created based on user feedback associated with successful identifications from models trained in the first stage. For example, a user provides feedback that a machine-learned model correctly identified a plug detected within a tilling assembly. In some embodiments, the first training set used to train that model may also be included in the second training set to further strengthen a relationship or association between data and identified objects during the second stage of training. The training engine 310 then re-trains a machine learning model using the second training set such that the machine learning model is customized to the autonomous farming vehicle 140 or the environment in which the vehicle 140 operates.

The preprocessing module 320 may perform various digital signal processing (DSP) techniques on the received sensor data. The DSP techniques may include filtering, averaging, peak-finding, down-sampling, any suitable DSP technique, or a combination thereof. For example, the preprocessing module 320 may apply a differential filter to video data over time and average over a particular time window of time to attenuate noisy, highly variant components of the sensor data. For example, data measured by 3D cameras that are representative of the vibration (i.e., vibration patterns) of shanks pulled through soil may be filtered to eliminate vibrations that are high in frequency but small in amplitude, which may not be associated with a displaced shank that produces vibrations that are larger in amplitude. The detection system 210 may use this filtered vibration pattern data to determine whether a tilling shank is malfunctioning. For example, the malfunction detection module 340 may determine that an average magnitude of the vibration pattern exceeds a threshold vibration magnitude, indicating that the corresponding tilling shank is likely malfunctioning.

The job quality assessment module 330 evaluates the quality of an autonomous routine performed by the autonomous farming vehicle 140. This job quality assessment may be dependent upon the number of malfunctions detected by the malfunction detection module 340, the rate of detected malfunctions, the number of modifications made to the autonomous routine in response to a detected malfunction, the percentage of an autonomous routine impacted by a malfunction, any suitable metric of evaluation associated with the occurrence of a malfunction, or a combination thereof. In one example, the job quality assessment module 330 receives, from the malfunction detection module 340, an indication that a malfunction has been detected.

The job quality assessment module 330 may monitor the percentage of an autonomous routine performed while the malfunction is present and determine a job quality assessment based on this percentage. For example, the assessment module 330 determines that, after a malfunction was detected, the operation of the autonomous farming vehicle 140 was not stopped until after it had performed an additional 10% of the predetermined track in its autonomous routine. Accordingly, the assessment module 330 may determine that the job quality cannot be greater than 90% successful (i.e., correlated with the percentage of the track that the tilling assembly was fully functional). In another example, the assessment module 330 receives an indication that a malfunction was detected during the vehicle 140's operation and, after the vehicle 140 has performed another 30% of its autonomous routine, receives an indication that the malfunction is no longer present (e.g., a plug that was detected had been removed from the tilling assembly naturally). Accordingly, the assessment module 330 may determine that the job quality cannot be greater than 70% successful.

The malfunction detection module 340 may determine a malfunction within the operation of the autonomous farming vehicle 140. The malfunction may include a displaced or missing shank, missing sweep, a plug within the tilling assembly, or a combination thereof. The malfunction detection module 340 may use machine learning, statistical modeling, conditional decision trees, any suitable computational or statistical model for determining a likelihood of malfunction occurring based on data from the sensors 220, or a combination thereof.

The malfunction detection module 340 may use a combination of different sensors' data with one or more models to determine whether there is a malfunction. For example, the malfunction detection module 340 may use a combination of data from the load cell 224 and the thermal camera 223 and a combination of a machine learning model and a statistical model included within the sweep malfunction detection model 360 to determine a sweep is missing. The machine learning model may provide the malfunction detection module 340 a count of the sweeps detected on the latest video data from the thermal camera 223. The malfunction detection module 340 may then determine there is a single sweep missing based on the count. The malfunction detection module 340 may input the number of sweeps missing into a statistical model along with additional parameters characterizing the operation of the autonomous farming vehicle 140 (e.g., the time of day or soil moisture level) to determine a likelihood that the sweep is missing and a malfunction has occurred (e.g., the likelihood exceeds a predetermined threshold).

In some embodiments, the malfunction detection module 340 may use a combination of models to determine a malfunction or plug within the tilling assembly. For example, the malfunction detection module 340 may receive a classification from a machine-learned model of the shank malfunction detection model 350 indicating that a shank is malfunctioning and another classification from a machine-learned model of the sweep malfunction detection model 360 indicating, with an initial degree of confidence, that a sweep is malfunctioning. The malfunction detection module 340 may determine a weighted score or modify the initial degree of confidence to determine that a sweep is malfunctioning.

Additionally, or alternatively, a machine-learned model of the sweep malfunction detection model 360 may provide an identifier of the objects identified or not identified (e.g., sweeps determined to be missing). For example, a machine-learned model may be configured to output an identifier of a shank (e.g., a unique identification number). The malfunction detection module 340 may use the output identifier to determine the position or location of the malfunctioning object within the tilling assembly. For example, shanks arranged in rows within a tilling assembly may be represented as a matrix, where the malfunction detection module 340 may determine, based on the identifier, that the shank in the first row and fourth column is likely malfunctioning. The malfunction detection module 340 may, likewise, use a statistical model of the sweep malfunction detection model 360 in combination with the machine-learned model's output and parameters, such as the duration of time that the missing sweep was used during the autonomous routine or its lifetime, to determine the likelihood that the sweep is missing.

The malfunction detection module 340 may determine a minimum amount of data or time during which the data is collected before determining whether a malfunction has occurred. For example, the malfunction detection module 340 may determine whether there is data collected that represents the state of the tilling assembly for at least two minutes (e.g., data collected from 8:00-8:03 AM is three minutes' worth of data, exceeding the threshold). Once sufficient data has been aggregated, the malfunction detection module 340 may proceed to input the data into one or more models that output the likelihood of a malfunction across multiple time stamps, thus providing an assessment of the likelihood of malfunction over time. The malfunction detection module 340 may determine, based on data with an earlier timestamp, that there is a likely malfunction, and determine, based on data with a later timestamp, the likelihood of the same malfunction occurring has dropped and indicates there is no malfunction. A change in determining that a malfunction is present may also be used to correct previous determinations of a malfunction that may have been provided to a user (e.g., a notification via the monitoring system 110). In another example, if the aggregated data shows a consistent likelihood of malfunction across time (e.g., 60% of the shanks were detected over a ten minute window), the malfunction detection module 340 may determine with a greater confidence that a malfunction has occurred.

Figure 15:
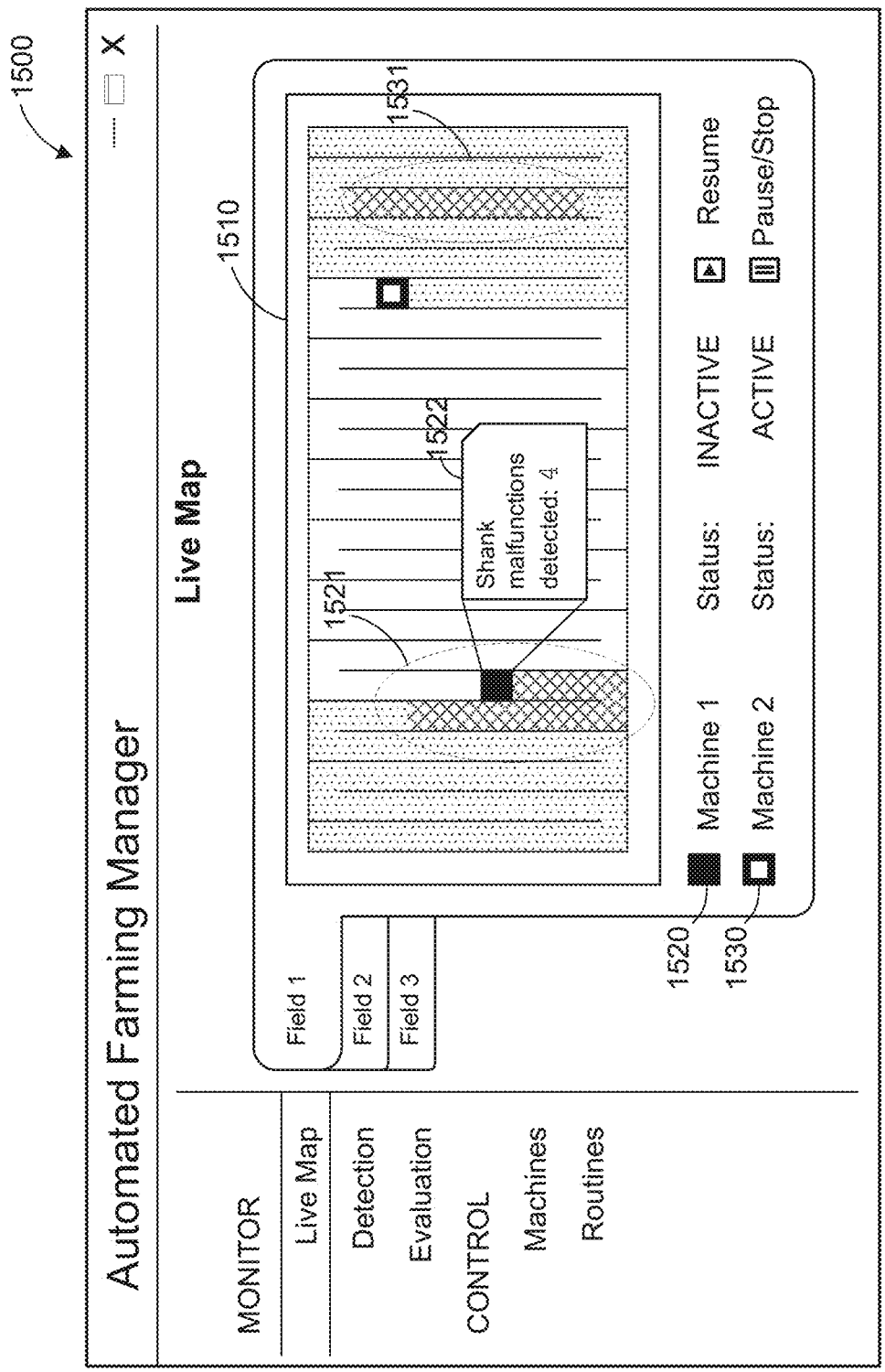
FIG. 15 illustrates a GUI for monitoring autonomous farming vehicles while the vehicles are performing predefined routines, in accordance with at least one embodiment.

By using a combination of models or accounting for data from a larger window of time, the malfunction detection module 340 may reduce the likelihood of false positive detections and increase the confidence level in its decision making. Additionally, the likelihood of a malfunction occurring may be determined based on a weighted combination of the different models' outputs. For example, the malfunction detection module 340 may emphasize the decision of the machine-learned model greater than the likelihood of malfunction determined by a statistical model. The malfunction detection module 340 may provide its determinations to the job quality assessment module 330 for further analysis or to the monitoring system 110 for further processing or display to the user. For example, the malfunction detection module 340 may determine the identifier of a malfunctioning shank and the locations associated with the malfunction (e.g., GPS coordinates of the autonomous farming vehicle's movement as the shank was malfunctioning). An example of such information provided to the monitoring system 110 for display is shown in FIG. 15 and described in the corresponding description.

The detection system 210 may include multiple machine learning models, the models configured to accept different inputs to generate a feature to recommend. Machine learning models of the detection system 210 may use various machine learning techniques such as linear support vector machine (linear SVM), boosting for other algorithms (e.g., AdaBoost), neural networks, logistic regression, naïve Bayes, memory-based learning, random forests, bagged trees, decision trees, boosted trees, boosted stumps, or any suitable supervised or unsupervised learning algorithm. The machine-learned models may also output a confidence score corresponding to the respective output (e.g., number of identified shanks or identified plug). The detection system 210 may use the calculated confidence score to determine whether a malfunction has been detected. For example, if the confidence score associated with a sweep shape classification exceeds a threshold score, the detection system 210 may determine that the detected shape is likely a tilling sweep or that it is an operational tilling sweep.

In some embodiments, the shank malfunction detection model 350, the sweep malfunction detection model 360, or the plug detection model 370 may be a collection of one or more models such as a machine-learned model and a statistical model configured to output a classification of a target object or a confidence score that the target object has been identified (e.g., classifying a tilling shank as malfunctioning or operational). For example, the sweep malfunction detection model 360 may be a statistical model that inputs one or more parameters of sensor data collected from a draw wire, RFID, load cell, ultrasonic sensor, distance sensor, through-beam sensor, or 3D camera or environmental data (e.g., temperature) to determine a likelihood that a sweep is operational or malfunctioning. In another example, the shank malfunction detection model 350 include a first machine-learned model trained using mono camera data of reflectors, a second machine-learned model trained using video camera data of tilling patterns, and a third statistical model trained using environmental data representative of the conditions under which the autonomous vehicle 140 performs autonomous routines.

The shank malfunction detection model 350 may be a machine-learned model configured to classify tilling shanks as malfunctioning or operational. In particular, the shank malfunction detection model 350 may receive, as an input, image or video data representative of a set of tilling shanks (e.g., arranged in a tilling assembly) and output a classification, for each of the set of tilling shanks, whether the tilling shank is operational or malfunctioning. The shank malfunction detection model 350 may be trained on sensor data representative of operational and malfunctioning tilling shanks.

In one example, the shank malfunction detection model 350 may be a machine-learned model trained using image data from the mono camera 221 capturing reflectors coupled to operational, properly placed shanks and other reflectors coupled to malfunctioning, loosely attached shanks that are more likely to detach from the tilling assembly than properly placed shanks. Using a training set generated based on the image data (e.g., by the machine learning model training engine 310), the shank malfunction detection model 350 may be trained to classify a reflector as being coupled to an operational shank or as being coupled to a malfunctioning shank. For example, an operational shank may reflect more light off of a circular reflector, creating a circular outline, than a malfunctioning shank, which may reflect light in a way that creates an elliptical or oval outline due to the misplacement of the malfunctioning shank. The shank malfunction detection model 350 may be configured to classify the shape of reflected light to identify whether a shank is malfunctioning or operational. In some embodiments, the autonomous farming vehicle 140 may be equipped with a light source. The detection system 210 may use the light source when natural light availability is low (e.g., during night operations) to detect malfunctioning shanks using reflective markers while the autonomous farming vehicle 140 is tilling. The light source may be directed at the tilling assembly during operation so that the mono camera 221 may continue to capture light reflected from the reflectors.

In another example, the shank malfunction detection model 350 may be a machine-learned model trained using image data from the video camera 222 capturing the tilling streaks in the field produced by the shanks 230 as the autonomous farming vehicle is performing its automated task. Using a training set generated based on the image data (e.g., by the machine learning model training engine 310), the shank malfunction detection model 350 may be trained to classify a tilling streak from untilled soil. For example, an operational shank may produce a tilling streak, which is a line in the soil that is darker or less textured than the untilled soil surrounding it. The tilling streak may be characterized by an even distribution of soil or field residue on either side of the streak produced in the field. The shank may produce a darker line in the soil due to the depth within the ground that an operational shank is configured to reach to break apart soil, where soil deeper in the ground has more moisture and is, hence, darker than soil at the surface.

Furthermore, the shank malfunction detection model 350 may be trained using sensor data characterizing tire tracks produced by the autonomous vehicle 140 such that the model 350 may be configured to classify the tilling streaks produced by operational shanks from untilled soil and tire tracks. The malfunction detection module 340 may receive the number of classified tilling streaks to compare against an expected number of tilling streaks to determine whether there is a malfunctioning shank.

The sweep malfunction detection model 360 may be a machine-learned model configured to classify tilling sweeps as malfunctioning or operational. In particular, the sweep malfunction detection model 360 may receive, as an input, image or video data representative of a set of tilling sweeps (e.g., coupled to tilling shanks of a tilling assembly) and output a classification, for each of the set of tilling sweeps, whether the tilling sweep is malfunctioning. The sweep malfunction detection model 360 may be trained on sensor data representative of operational and malfunctioning tilling sweeps that are below the ground or above the ground. For example, sensor data from thermal camera 223 may be used to classify below-ground tilling sweeps and data from the video camera 222 may be used to classify above-ground tilling sweeps (e.g., recognizing the shape of a tilling sweep that has not been obstructed by accumulated dirt).

In one example, the sweep malfunction detection model 360 may be trained using thermal sensor data from the thermal camera 223 capturing the relative temperature of operational sweeps pulled through soil during operation of the autonomous farming vehicle 140. Using a training set generated based on the thermal sensor data (e.g., by the machine learning model training engine 310), the sweep malfunction detection model 360 may be trained to classify a sweep as operational or malfunctioning. An operational sweep creates friction with the soil as the autonomous farming vehicle 140 operates, which increases the temperature of the sweep relative to the soil surrounding it and produces an outline of the sweep's shape as captured by the thermal camera 223.

The sweep malfunction detection model 360 may be configured to classify the shape of the sweep to identify whether the sweep is malfunctioning or operational. That is, an operational sweep may be associated with a given shape depicted in the data from the thermal camera 223 while a malfunctioning sweep is associated with a different shape or no shape at all (i.e., it has detached from the tilling assembly). The sweep malfunction detection model 360 may be configured to detect the shape of a sweep using a Haar-feature classifier. The Haar classifier may be trained by the machine learning model training engine 310 to learn the shape or a descriptor of an operational tilling sweep.

In some embodiments, the sweep malfunction detection model 360 may be a collection of one or more models such as a machine-learned model and a statistical model configured to output a classification or confidence score that a tilling shank is malfunctioning or operational. The sweep malfunction detection model 360 may be a statistical model that inputs one or more parameters of sensor data collected from a draw wire, RFID, load cell, ultrasonic sensor, distance sensor, through-beam sensor, or 3D camera or environmental data to determine a likelihood that a shank is operational or malfunctioning. For example, a statistical model may use a distance sensor's detection that a shank has been misplaced, which may be associated with a sweep that has detached from the shank, and the climate during tilling, which may indicate a moisture level in the soil that increases the likelihood of equipment malfunction, to determine a probability that a sweep has malfunctioned.

The plug detection model 370 may be a machine-learned model configured to detect a plug within a tilling assembly. In particular, the plug detection model 370 may receive, as an input, image or video data representative of a set of tilling patterns produced by plugged tilling shanks and a set of tilling patterns produced by unplugged tilling shanks within the tilling assembly and output a classification, for each of the tilling patterns, whether a plug is detected. In some embodiments, the plug detection model 370 may be further trained to classify a tilling pattern produced by a plugged tilling shank from a tire track produced in the soil by the autonomous farming vehicle 140. For example, labeled image data from the video camera 222 capturing tire tracks may be used to train the model 370, where the image data is labeled to identify whether one or more tire tracks are present in the soil. For example, the detection system 210 may have an expected number of tilling streaks within the pattern based on the number of shanks within the tilling assembly. The plug detection model 370 may be used to determine the number of tilling streaks detected within the image data, which may be compared against the expected number to determine if a plug is detected.

In one example, the plug detection model 370 may be trained using image data from the video camera 222 capturing the tilling streaks produced by operational sweeps pulled through soil during operation of the autonomous farming vehicle 140. Using a training set generated based on the video camera data (e.g., by the machine learning model training engine 310), the plug detection model 370 may be trained to classify tilling patterns associated with plugged shanks (i.e., a malfunction detected) and tilling patterns associated with shanks without plugs. An plug in the shanks of a tilling assembly may create a tilling pattern distinct from a tilling pattern produced without a plug present. For example, a plug may produce a line in the soil that is relatively darker than surrounding soil that has not been tilled, but not as dark as soil that has been tilled. Accordingly, the plug detection model 370 may be configured to classify tilling patterns to identify whether a plug is detected and the operation of the vehicle 140 is malfunctioning.

The detection system 210 may use multiple outputs from the plug detection model 370 to determine whether a plug was detected at one point in time and was naturally removed from the tilling assembly at a later time. For example, the malfunction detection module 340 may access additional image data after a plug is detected based on previously captured image data. A machine-learned model of the plug detection model 380 may be applied to the additional image data to determine that a plug is absent from the additional image data. In response to detecting that the previously detected plug is not in between the tilling shanks anymore, the detection system 210 may generate instructions to modify the autonomous routine of the autonomous farming vehicle 140 (e.g., reverting back to an earlier version of the routine that was active prior to the plug being detected).

In some embodiments, the plug detection model 370 may be a statistical model that inputs one or more parameters of sensor data collected from a draw wire, load cell, ultrasonic sensor, distance sensor, through-beam sensor, or 3D camera or environmental data to determine a likelihood that there is a plug within the shanks of a tilling assembly. For example, a statistical model may use a distance sensor's detection that an object has been plugged between two shanks, and load cell data, which may indicate a greater draft force required to pull the tillage assembly and the plug through the soil, to determine a probability that a plug is detected.

The functions of the detection system 210 and monitoring system 110 described herein are not necessarily distinct. That is, operations performed by the detection system 210 may likewise be performed by the monitoring system 110. For example, while the malfunction detection module 340 and the models 350, 360, and 370 are depicted as components of the detection system 210, equivalent components may be a part of the monitoring system 110, where sensor data is transmitted over the network 130 for the equivalent components to determine whether a malfunction has occurred. Similarly, operations performed by the monitoring system 110 may be performed by the detection system 210. For example, the monitoring system 110 is described herein as determining whether a portion of the autonomous routine has been successfully performed, the detection system 210 may perform a similar determination based on a particular portion of a field traveled by the autonomous farming vehicle and the number of malfunctions detected over the portion traveled.

Tilling Assembly

Figure 4:
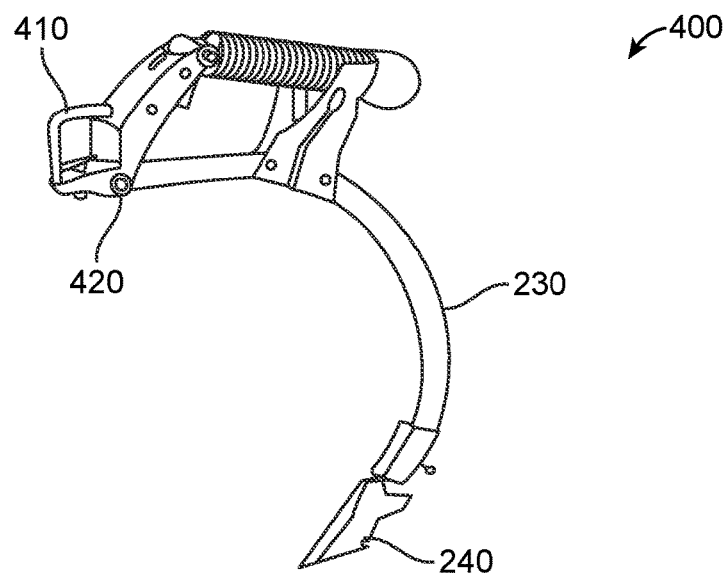
FIG. 4 depicts a shank assembly for tilling fields by the autonomous farming vehicle of FIG. 1, in accordance with at least one embodiment.

FIG. 4 depicts a shank assembly 400 for tilling fields by the autonomous farming vehicle of FIG. 1. The shank assembly 400 includes the shank 230, the sweep 240, a U-bolt 410, and a pivot bolt 420. The shank assembly 400 is a curved and C-shaped such that the bottom of the assembly, at the sweep 240, breaks the soil and causes organic matter near the soil's surface to mix deeper into the soil as the shank assembly 400 is pulled through the soil. The U-bolt 410 and the pivot bolt 420 couple the shank 230 to a tilling assembly. The sweep 240 may be coupled to the shank 230 (e.g., using plow bolts). Coupling locations such as at the U-bolt 410 or at the pivot bolt 420 are potential failure points that may cause a shank assembly to be misplaced. A properly placed shank assembly is engaged with the ground and in position where the point of the sweep is pointed forwards, in the same direction as the direction of the autonomous farming vehicle's travel. Although a chisel point sweep is depicted, any suitable form of sweeps may be identified by the detection system 210 for malfunctions. For example, the sweep 240 may be a spike sweep, twisted shovel point sweep, shovel sweep, conservation sweep, chisel plow sweep, chisel spike sweep, or any suitable sweep form for breaking through dirt.

Figure 5:
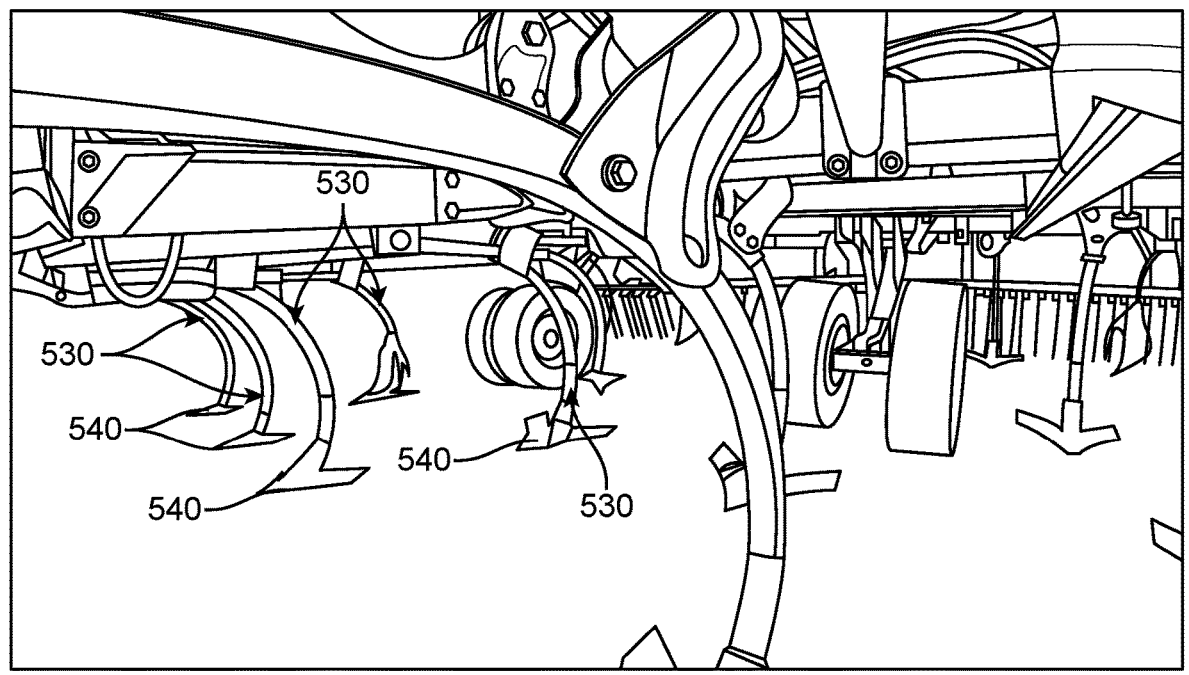
FIG. 5 depicts shanks within a tilling assembly, in accordance with at least one embodiment.

FIG. 5 depicts shanks within a tilling assembly 500. The tilling assembly 500 includes shank assemblies with shanks 530 and sweeps 540. The sweeps 540 are winged chisel plow sweeps. The shank assemblies are arranged in rows in the tilling assembly 500. The relative locations or positions of each of the shank assemblies within the tilling assembly 500 may be measured or recorded prior to the start of an automated task. Likewise, each of the shank assemblies within the tilling assembly 500 may be assigned a unique identifier (e.g., an RFID tag on each shank assembly, each shank, or each sweep in the tilling assembly 500). Although the tilling assembly 500 is depicted as a chisel plow tilling assembly, the detection methods described herein may be used for a variety of tilling assembly types. The detection system may be used for shallow tillage such as vertical tillage (e.g., using disc blades or harrows), medium-depth tillage (e.g., using chisel plows), or deep tillage (e.g., using a moldboard plow).

Applications of the Detection System

Figure 6:
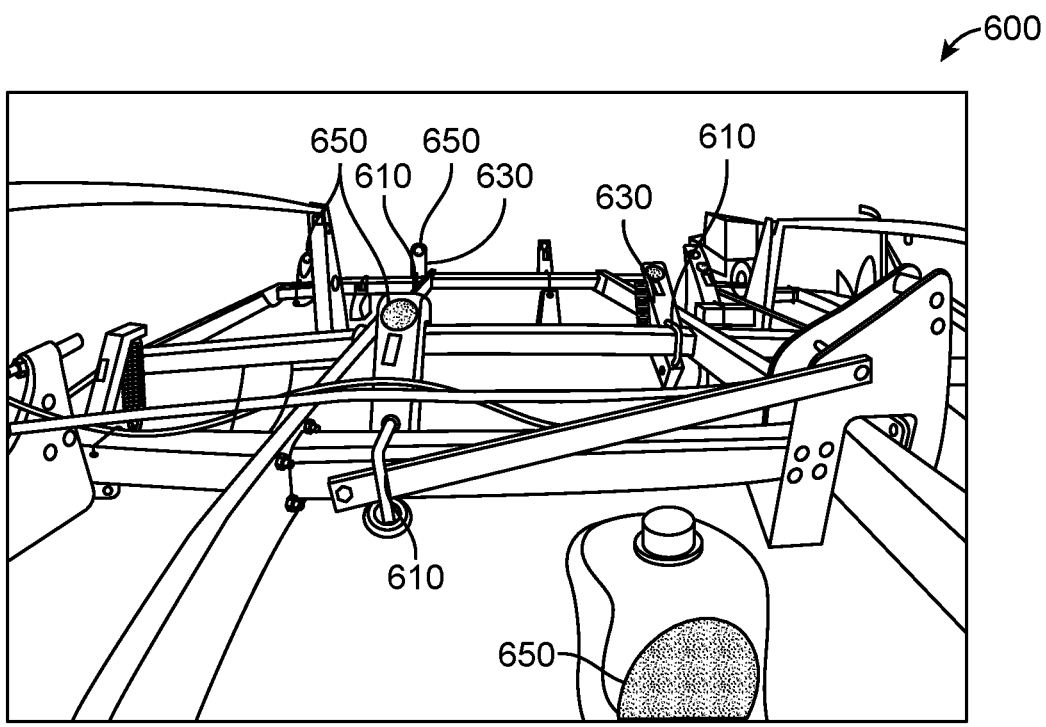
FIG. 6 depicts reflectors captured in image data captured by a rear facing video camera coupled to an autonomous farming vehicle, in accordance with at least one embodiment.

FIG. 6 depicts reflectors 650 captured in image data 600 captured by a rear facing video camera coupled to an autonomous farming vehicle. The image data 600 may be stored in the sensor records 250 for access by the detection system 210 or provided directly to the system 210. The reflectors 650 are coupled to the shanks 630 or shank assemblies attached to a tilling assembly via U-bolt 610. In some embodiments, the reflectors 650 are high intensity prismatic or diamond grade retro reflector markers or any suitable reflective marker meeting the specifications of ASTM International's Type XI sheeting standard for reflective sign sheeting. As referred to herein, the terms "reflector" and "marker" may be used interchangeably. The reflectors 650 may be coupled to the shanks of each of the shank assemblies or some of the shank assemblies.

Although the shape of the reflective marker is depicted in FIG. 6 as being circular, the shape of the reflective marker may be any suitable shape for classifying a difference between a operational shank and a malfunctioning shank (e.g., rectangular, triangular, oblong, circular, three-dimensional such as spherical, etc.). That is, the shape of the marker coupled to an operational shank, as captured by a mono camera or an RGB camera, is distinguishable from the shape of the marker coupled to a malfunctioning shank, as captured by the mono camera or the RGB camera. Light reflected from the reflectors 650 may be captured by the mono camera 221, an RGB camera, or a combination thereof and processed by the detection system 210 to identify a number of operational shanks or malfunctioning shanks. The reflectors 650 may be coupled to respective shanks via a connector that raises the reflectors 650 to a particular above the respective shanks, where the connector (e.g., a rod, board, beam, etc.) connects a reflector to a tilling shank.

Figure 7:
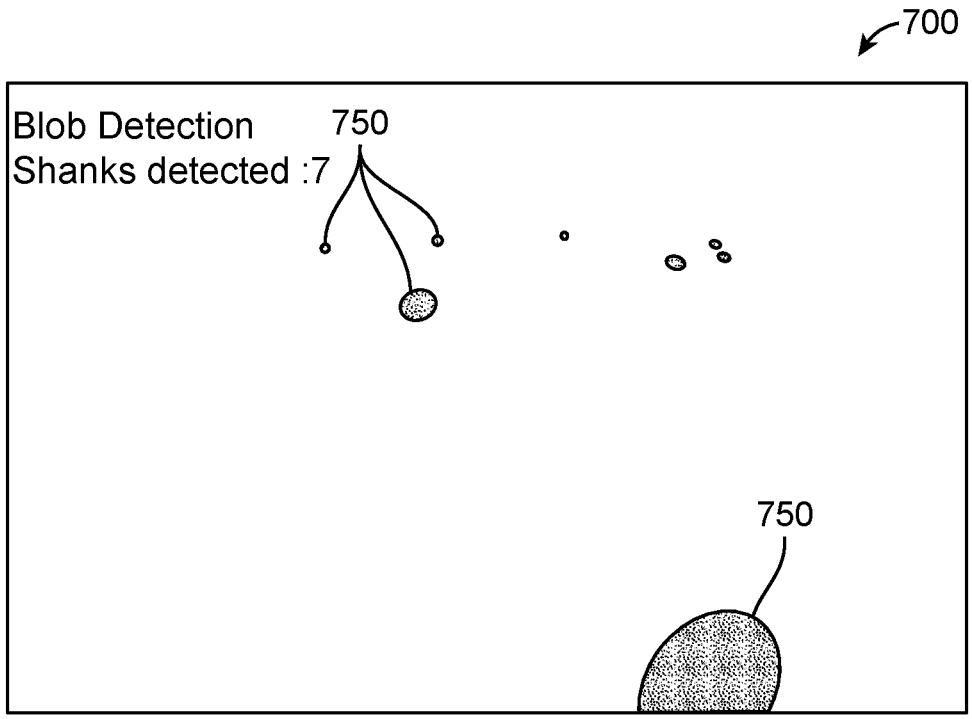
FIG. 7 is a visualization of identified reflectors by the detection system of FIG. 3, in accordance with at least one embodiment.

FIG. 7 is a visualization 700 of identified reflectors 750 by the detection system of FIG. 3. The mono camera 221 or an RGB camera of the autonomous farming vehicle 140 may capture image data including reflections from the reflectors 750. The detection system 210 may input the image data into the preprocessing module 320 to further distinguish reflective markers from its non-reflective surroundings. For example, the preprocessing module 320 may apply DSP filters to allow areas of high light saturation corresponding to reflections while rejecting relatively low-saturated areas, which may produce a binary color representation (e.g., black and white) of the reflectors 750. The detection system 210 may input the preprocessed data into the shank malfunction detection model 350, which may include a machine-learned model configured to classify operational and malfunctioning shanks based on the shape of the reflection produced by the reflectors 750. The shank malfunction detection model 350 may determine a number of reflectors associated with operational shanks depicted in the preprocessed data. This determination is depicted in visualization 700, where the detection system 210 has detected seven shanks. The visualization 700 may be provided to the user via a display at the monitoring system 100. The malfunction detection module 340 may use the determined number of operational shanks to determine whether any shanks are malfunctioning (e.g., by comparing the determined number to an expected number of operational shanks).

Figure 8:
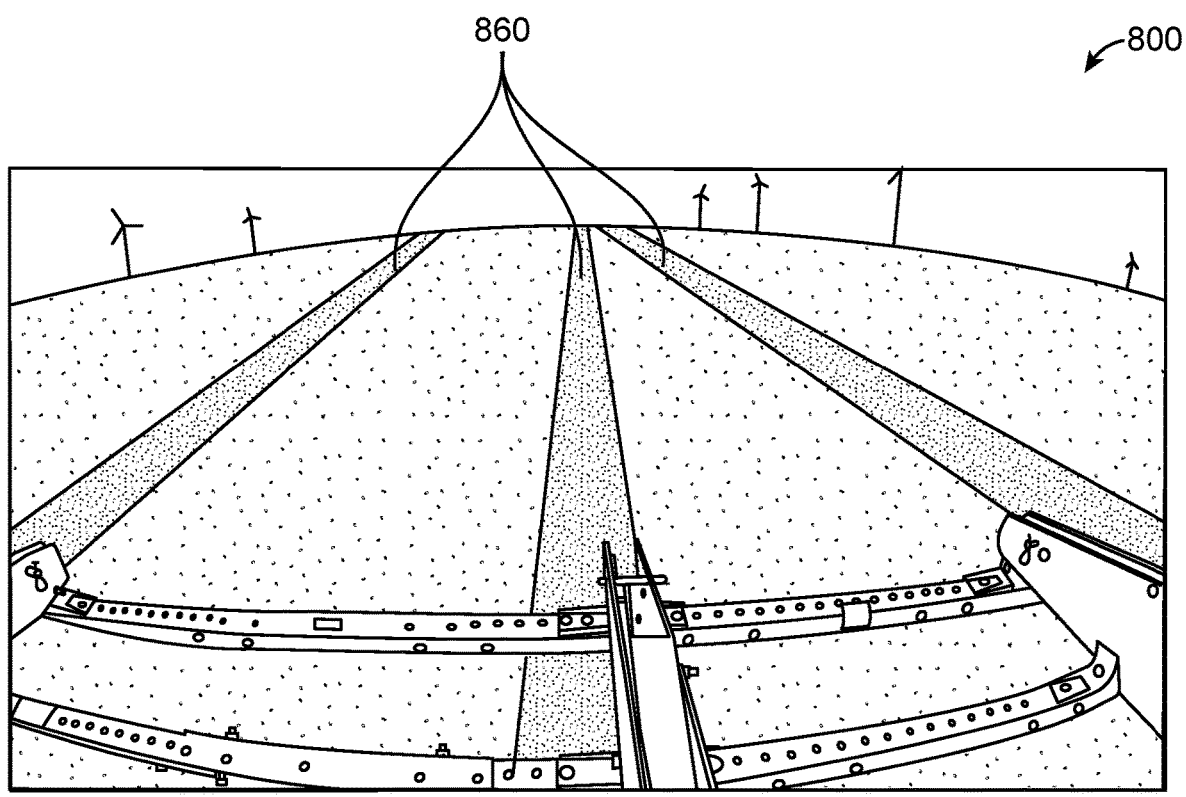
FIG. 8 depicts tilling streaks produced by an autonomous farming vehicle and captured in image data, in accordance with at least one embodiment.

FIG. 8 depicts tilling streaks 860 produced by an autonomous farming vehicle and captured in image data 800. The tilling streaks 860 are produced by the shank assemblies as they are pulled through the soil. Organic matter from the surface of the field is mixed in with the soil at deeper depths, which may have a higher moisture level than soil at the surface. The soil with greater moisture is exposed within the tilling streaks, hence producing darker lines in the field relative to the surrounding soil. The image data 800 may be captured by the video camera 222 and used by the detection system 210 to determine whether there is a malfunction in the tilling assembly or a plug detected (e.g., using one or more of the shank malfunction detection model 350, the sweep malfunction detection model 360, or the plug detection model 370).

FIG. 9 depicts thermal sensor data 900 capturing sweeps 940 of a tilling assembly. The thermal sensor data 900 may be captured by the thermal camera 223 and used by the detection system to classify the tilling sweeps 940 as operational or malfunctioning. For example, the sweep malfunction detection model 360 may use a Haar-feature classifier to identify the winged shape of the sweeps 940. A visualization of this classification is depicted in FIG. 10 and described in the corresponding description.

FIG. 10 is a visualization 1000 of identified sweeps 1040 by the detection system 210 of FIG. 3. A Haar-feature classifier of the sweep malfunction detection model 360 may be used to identify bounding boxes enclosing likely sweeps characterized by the winged shape outline that the Haar-feature classifier is trained to identify. The sweep malfunction detection model 360 may be further configured to determine a confidence score associated with the likelihood of correctly identifying a sweep. For example, in a first identification 1070, the sweep malfunction detection model 360 has determined a bounding box 1072 enclosing a shape matching a sweep's outline with a confidence score 1071 of 1.42, indicating a high likelihood that the shape corresponds to a sweep. In another example, in a second identification 1073, the sweep malfunction detection model 360 has determined a bounding box 1075 enclosing a shape that matches a sweep's outline with a confidence score 1074 of 0.06, indicating a low likelihood that the shape corresponds to a sweep.

In some embodiments, the detection system 210 identifies bounding boxes in thermal sensor data using the sweep malfunction detection model 360, where each of the bounding boxes indicate a sweep is likely present in the tilling assembly. The detection system 210 may identify an absent bounding box across successive thermal images. For example, images from the thermal camera 223 may be analyzed by the detection system 210 chronologically, where the sweep malfunction detection model 360 is applied to data associated with each thermal image. The detection system 210 may determine that in a first thermal image, twenty bounding boxes are detected, and that in a second thermal image captured subsequent to the first image, nineteen bounding boxes are detected. The detection system 210 determines, based on the absent bounding box, a position of a tilling sweep that may be malfunctioning among the other below-ground tilling sweeps of the tilling assembly. For example, the location indicate a particular row of sweeps of the tilling assembly and the position of the sweep in that row. The detection system 210 may also determine, based on the absent bounding box, whether the tilling sweep is malfunctioning. For example, if a bounding box is absent for more than a threshold number of thermal images or a threshold period of time, the detection system 210 may determine that the tilling sweep has malfunctioned by detaching from the tilling assembly.

Figure 11:
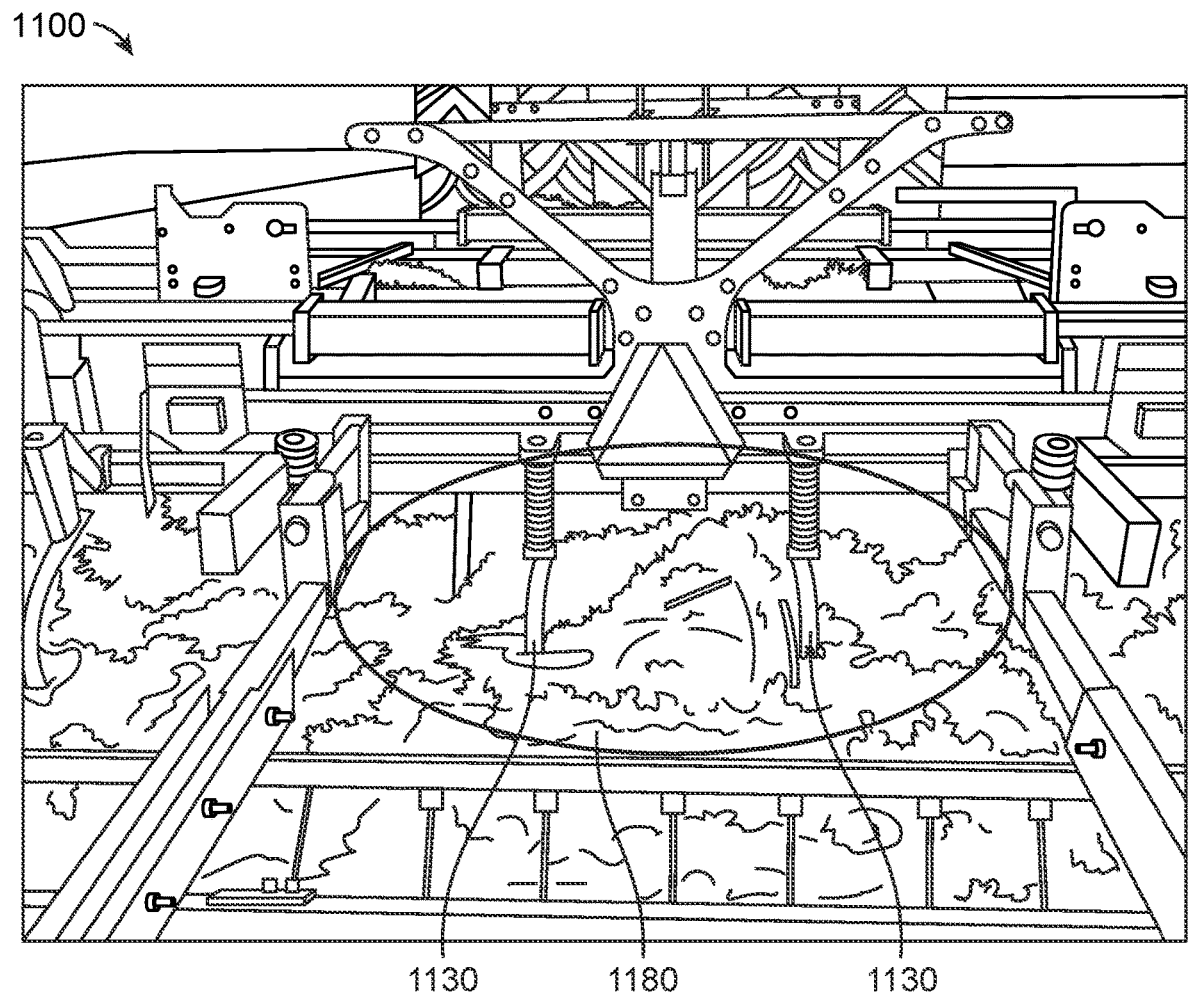
FIG. 11 depicts a plug within a tilling assembly, in accordance with at least one embodiment.
Figure 12:
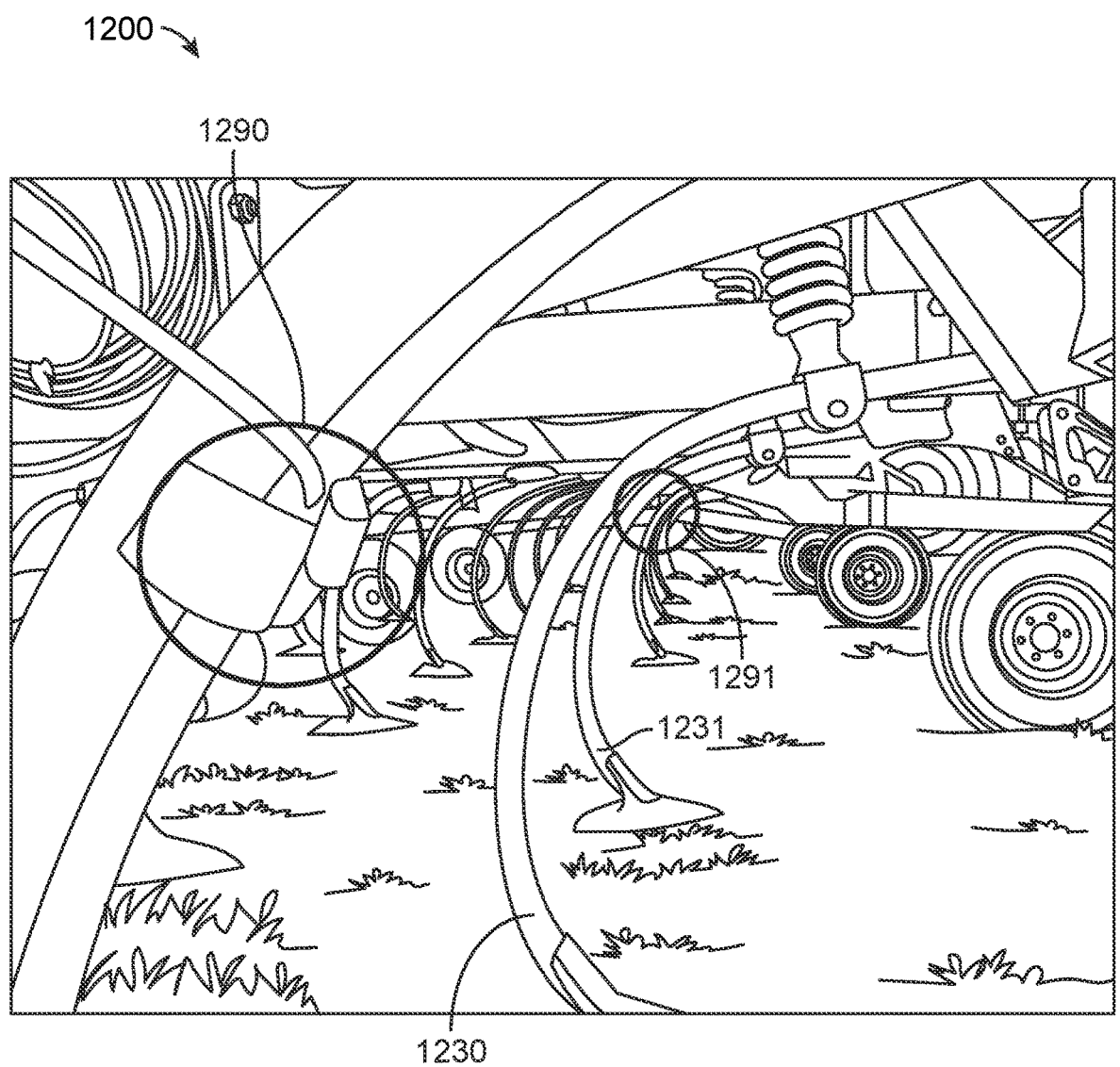
FIG. 12 depicts sensors coupled to a tilling assembly, in accordance with at least one embodiment.

FIG. 11 depicts a plug 1180 within a tilling assembly. The plug 1180 is located between the shanks 1130 of the tilling assembly. The plug 1180 may include debris or an accumulation of soil as the autonomous farming vehicle is pulling the tilling assembly through the soil. The plug 1180 may adversely affect the quality of the tilling job performed by the autonomous farming vehicle. Hence, detecting the plug and modifying the operation of the vehicle in response to the detection may prevent a reduction in the quality of tilling performed. The detection system 210 may use various sensors to detect a plug within the shanks 1130. For example, a through-beam sensor or the distance sensor 226 may be coupled to one or more shanks to detect the presence of an object between the shanks. An example using a through-beam sensor is depicted in FIG. 12 and described in the corresponding description. Additionally, a machine-learned model (e.g., the plug detection model 370) may be used to identify a pattern in the soil produced by a plug within the shanks 1130.

FIG. 12 depicts sensors 1290 and 1291 coupled to a tilling assembly. The sensors 1290 and 1291 may be components of a through-beam sensor, where the sensor 1290 is a light receiver and the sensor 1291 is a light emitter. The beam emitted from the sensor 1291 may pass behind the shanks 1230 and 1231. A plug between the shanks 1230 and 1231 may disrupt the light beam between the sensors 1290 and 1291, which the through-beam sensor may measure for use by the detection system 210 to determine whether there is a plug within the tilling assembly. For example, the detection system 210 may determine a measure (e.g., an amplitude or average amplitude over a period of time) of the signal received at the sensor 1290 and compare the measure to a threshold measure to determine whether a plug is detected. The sensors 1290 and 1291 may be associated with the respective shank assemblies to which they are coupled such that unique identifiers of the respective shank assemblies may be identified as having a plug between them or between the shanks 1230 and 1231 that are further between them.

In some embodiments, ultrasonic sensors may be coupled to the tilling shanks (e.g., in locations similar to those depicted in FIG. 12 at which the sensors 1290 and 1291 are located). The detection system 210 may access (e.g., in real-time) ultrasonic sensor data from an ultrasonic sensor (e.g., the ultrasonic sensor 225) that is coupled to a tilling shank. The ultrasonic sensor may be configured on the tilling shank to determine a distance between the tilling shank and another tilling shank in the tilling assembly (e.g., the transmitter and receiver of the sensor 225 facing the other tilling shank). The system 210 may determine a measure of a signal received by the ultrasonic sensor (e.g., the travel time of the sound wave) is below a threshold level indicating that there is a plug between the shanks. In some embodiments, the ultrasonic sensor 225 is one of multiple ultrasonic sensors coupled to respective tilling shanks, where each is associated with an identifier. The identifier may be used to determine a location of the plug among the tilling shanks.

Automated Farming Management Interfaces

Figure 13:
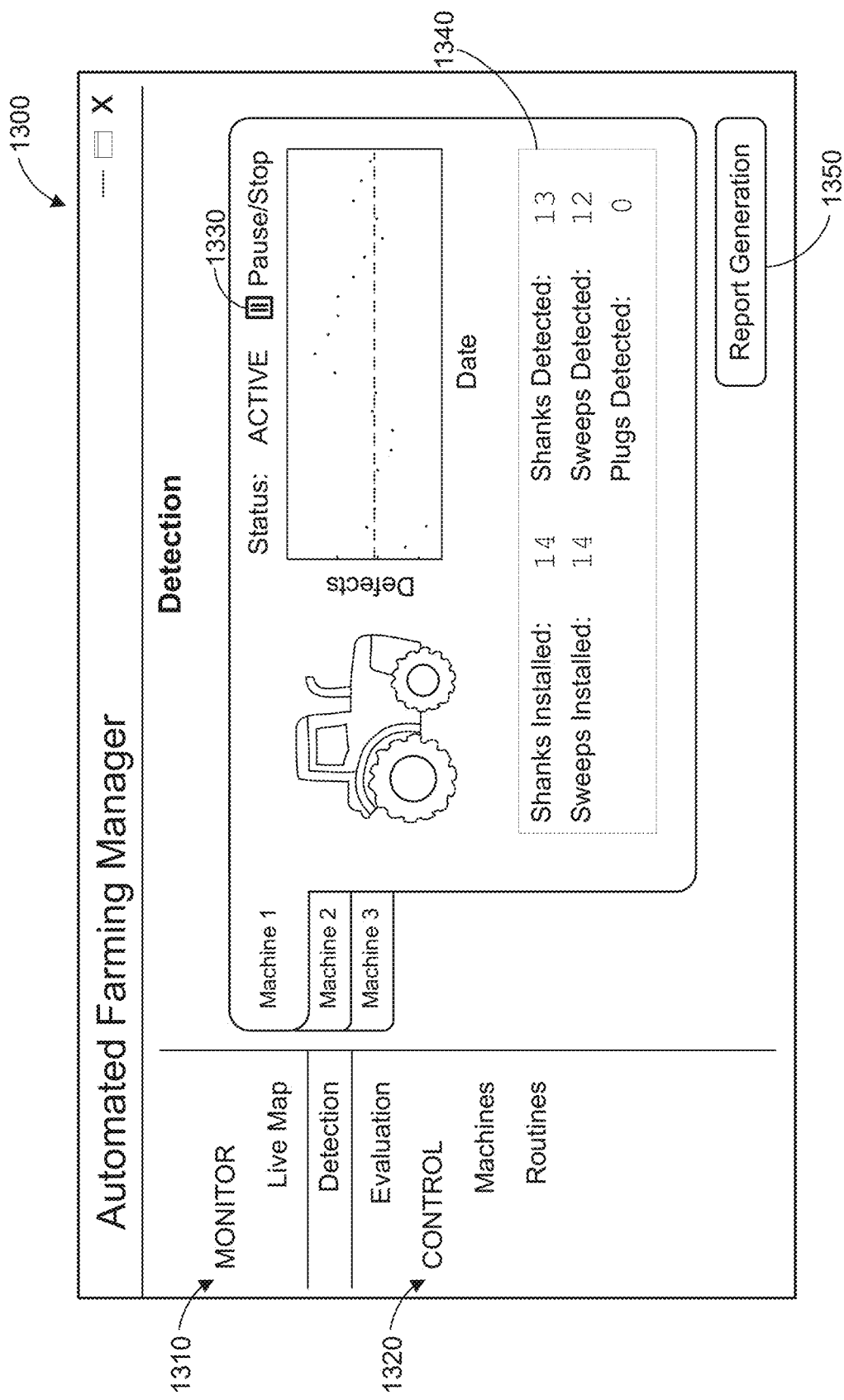
FIG. 13 illustrates a graphical user interface (GUI) for monitoring malfunctions in an autonomous farming vehicle, in accordance with at least one embodiment.

FIG. 13 illustrates a graphical user interface (GUI) 1300 for monitoring malfunctions in an autonomous farming vehicle. The GUI 1300 may be generated by the monitoring system 110 as a part of a software application for controlling and monitoring autonomous farming vehicles and the autonomous routines performed. The GUI 1300 includes a monitoring menu 1310 and a control menu 1320. Within the monitoring menu 1310, the user may select the GUI 1300 that includes a display of the status of each of the user's autonomous farming vehicles. For example, the count of malfunctions detected for the user's "Machine 1" is depicted in a summary field 1340 that summarizes the equipment installed on the vehicle and number of malfunctions detected. Control features such as an operation button 1330 may be included within the GUI 1300 to quickly adjust a vehicle's operation if the summary field 1340 indicates to a user that manual adjustment should be made. The GUI 1300 may have alternative configurations than shown in FIG. 13, including for example different, fewer, or additional components. For example, the GUI 1300 may include selectable parameters for report generation, enabling the user to specify the parameter (e.g., time, temperature, etc.) over which the detected malfunctions should be evaluated against (e.g., the number of malfunctions as a function of temperature).

The GUI 1300 includes a report generation button 1350 for requesting reports of the malfunctions detected by the detection system 210. The reports may be based on data from the sensors 220 (e.g., from the sensor records 250), a summary of malfunctions detected by the detection system 210, and relevant parameters of conditions under which the autonomous machine performed its routine. In some embodiments, the report may be a direct presentation of the data collected. For example, the monitoring system 110 may export a file with the information shown in summary field 1340 in response to the user selecting the report generation button 1350. Alternatively, or additionally, the monitoring system 110 may further process the data to generate reports describing trends or patterns in the data. For example, the monitoring system 110 may determine a correlation between temperature and the number or type of malfunction detected. The determined correlation may be included in the report generated for the user upon selecting the report generation button 1350.

Although not depicted, the monitoring system 110 may generate interfaces selectable under the control menu 1320 that enable a user to edit the operation of the user's autonomous farming vehicles or the autonomous routines assigned to those vehicles. For example, the monitoring system 110 provides an interactive map of the user's fields where the user may place target destination points to which an autonomous farming vehicle must travel during its autonomous routine. The monitoring system 110 may provide toggles in the control interfaces that enable the user to specify a desired speed at which autonomous farming vehicle should operate. For example, the user may specify that the autonomous farming vehicle 140 complete a tilling task within a time range of 1-2 hours, beginning at 7 AM.

Furthermore, while the monitoring system 110 may provide the user a manual way to modify the autonomous routine of the autonomous farming vehicles, the detection system 210 onboard the respective vehicles may determine to modify the autonomous routine without input from the user. For example, if the detection system 210 has determined that a sweep is missing from the tilling assembly, the detection system 210 may provide instructions to the controller managing the automated operation of the vehicle to pause the operation of the vehicle to prioritize the retrieval of the missing sweep, which may damage machines that encounter it within the soil, over the continued tilling operation.

Figure 14:
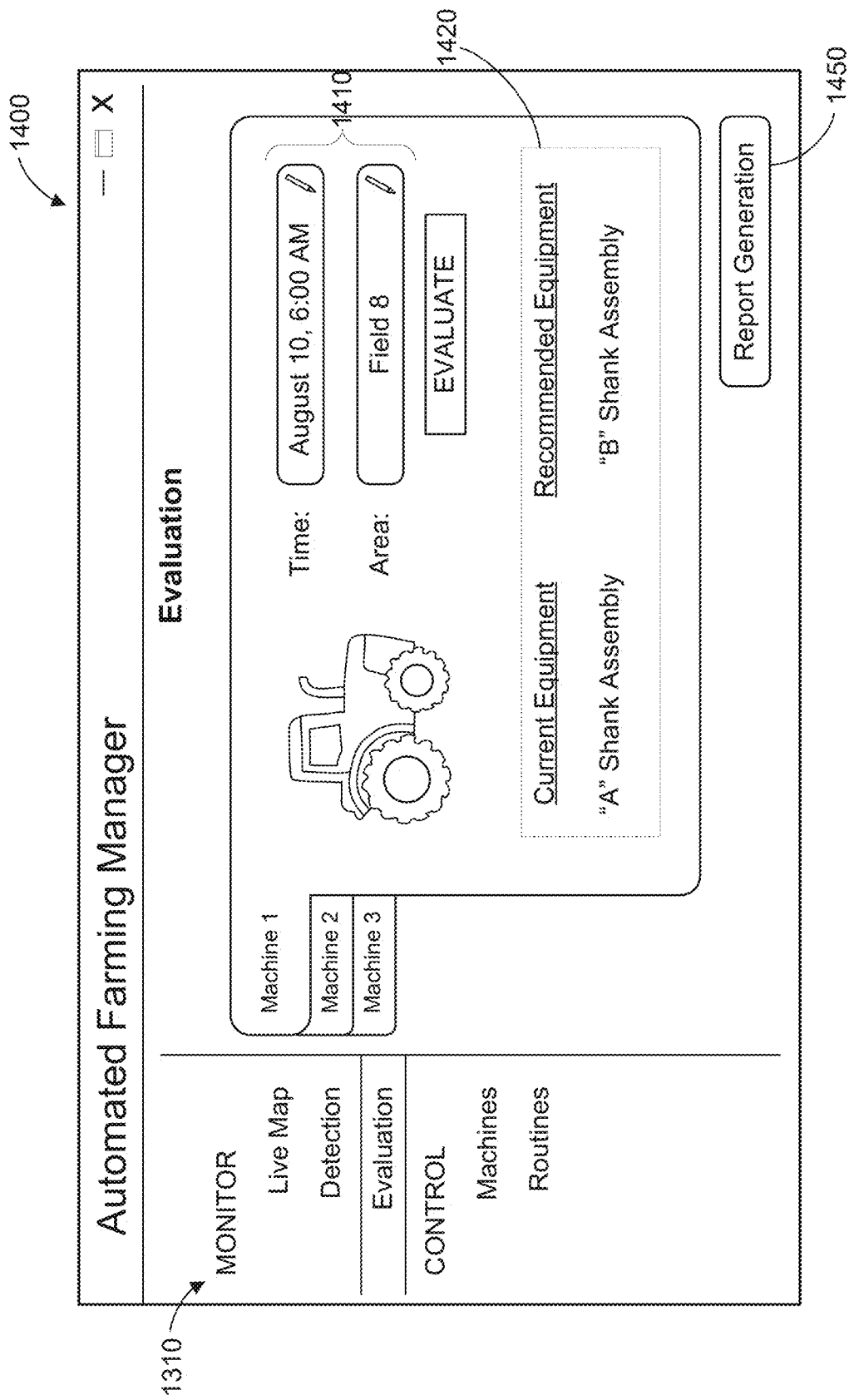
FIG. 14 illustrates a GUI for evaluating the monitored malfunctions in an autonomous farming vehicle, in accordance with at least one embodiment.

FIG. 14 illustrates a GUI 1400 for evaluating the monitored malfunctions in an autonomous farming vehicle. The monitoring system 110 may generate the GUI 1400 as a part of the software application also depicted in FIG. 13 for controlling and monitoring autonomous farming vehicles and the autonomous routines performed. The GUI 1400 includes evaluation parameter entry fields 1410, evaluation summary field 1420, and a report generation button 1450. The GUI 1400 may have alternative configurations than shown in FIG. 14, including for example different, fewer, or additional components. For example, GUI 1400 may include input fields for the user to specify a particular equipment combination or arrangement for an autonomous farming vehicle. The monitoring system 110 may then evaluate a likelihood that the user's specified parameters would be associated with a predicted malfunction or if the numbers or compare the predicted malfunction to historical records of malfunctions to determine whether the number of malfunctions would increase or decrease with the specified equipment combination or arrangement as compared with the user's present equipment or arrangement.

Within the monitoring menu 1310, the user may select the GUI 1400 that includes an evaluation tool for analyzing each of the user's autonomous farming vehicles. In some embodiments, the GUI 1400 may be used to evaluate the quality of past operations or predict the quality of future operations by a given machine. For example, the GUI 1400 includes the evaluation parameter entry fields 1410 for a user to specify operating condition parameters such as the time of day or year and the area of a farm that an autonomous farming vehicle is to operate or has operated. The monitoring system 110 may determine, based on the parameters specified by the user via the evaluation parameter entry fields 1410, a recommendation for the user related to the autonomous farming vehicles, the farming equipment used, or the autonomous routines specified.

For example, the monitoring system 110 uses one or more statistical models to determine a correlation between the user's environment, a parameter of an arrangement of the tilling assembly (e.g., the minimum or maximum spacing of tilling shank assemblies within the tilling assembly), and a job quality. The user may receive a report, upon selecting report generation 1450, that recommends that the user increase the minimum spacing of tilling shank assemblies to at least one foot to increase the job quality by approximately 5% or reduce the likelihood of malfunction by a corresponding percentage. In another example, the monitoring system 110 may recommend, based on parameters specified in fields 1410, previous job quality assessments, and a history of autonomous routine settings, that the user adjust the settings of an autonomous routine by reducing the number of tillage passes over the same area of a field.

FIG. 15 illustrates a GUI 1500 for monitoring autonomous farming vehicles while the vehicles are performing predefined routines. The monitoring system 110 may generate the GUI 1500 as a part of the software application also depicted in FIGS. 13 and 14 for controlling and monitoring autonomous farming vehicles and the autonomous routines performed. The GUI 1500 includes an interactive map 1510 corresponding to a particular field on a user's farm. The map 1510 captures the operations of autonomous farming vehicles represented by icons 1520 and 1530. The operations may further include the areas of the field for which the autonomous routine has been completed or where a malfunction was detected. The GUI 1500 may have alternative configurations than shown in FIG. 15, including for example different, fewer, or additional components. For example, the GUI 1500 may include a button to modify the autonomous routine directly from the interactive map 1510.

The interactive map 1510 may be a live or automatically updated map (i.e., reflecting the location and status of the autonomous farming vehicles in substantially real time). The interactive map 1510 may visually distinguish (e.g., highlight) portions of the autonomous routine that are successfully finished from portions that are unsuccessfully finished. To determine whether a portion of a field is successfully finished, the monitoring system 110 may determine that the number of malfunctions detected did not exceed a threshold number. Likewise, to determine whether a portion of a field is unsuccessfully finished, the monitoring system 110 may determine that the number of malfunctions detected met or exceeded a threshold number. For example, portions 1521 and 1531 of the interactive map 1510 indicate areas of the field that are unsuccessfully tilled due to a number of misplaced shanks, missing shanks or sweeps, or detected plugs met or exceeded a threshold number.

In some embodiments, the detection system 210 may control when malfunction detections are reported to the monitoring system 110 for display. For example, the detection system 210 may determine whether a threshold number of malfunctions has occurred at a location or portion of a field. If the number of malfunctions meets or exceeds the threshold number, the detection system 210 may generate a notification identifying the location or portion of the field and transmit the notification to the monitoring system 110. If the number of malfunctions does not meet the threshold number, the detection system 210 may continue to monitor for detections without notifying the monitoring system 110.

The monitoring system 110 may provide a toggle for the user to adjust this threshold number via the GUIs described herein. The GUI 1500 may allow the user to interact with the icons 1520 or 1530 representing the autonomous farming vehicles. For example, a user may select or hover over (e.g., using a cursor) the icon 1520 within the live map 1510 and cause the monitoring system 110 to generate a pop up window 1522 showing the particular malfunctions that have been detected for the corresponding vehicle during the present autonomous routine.

Processes for Detecting Malfunctions Using the Detection System

Figure 16:
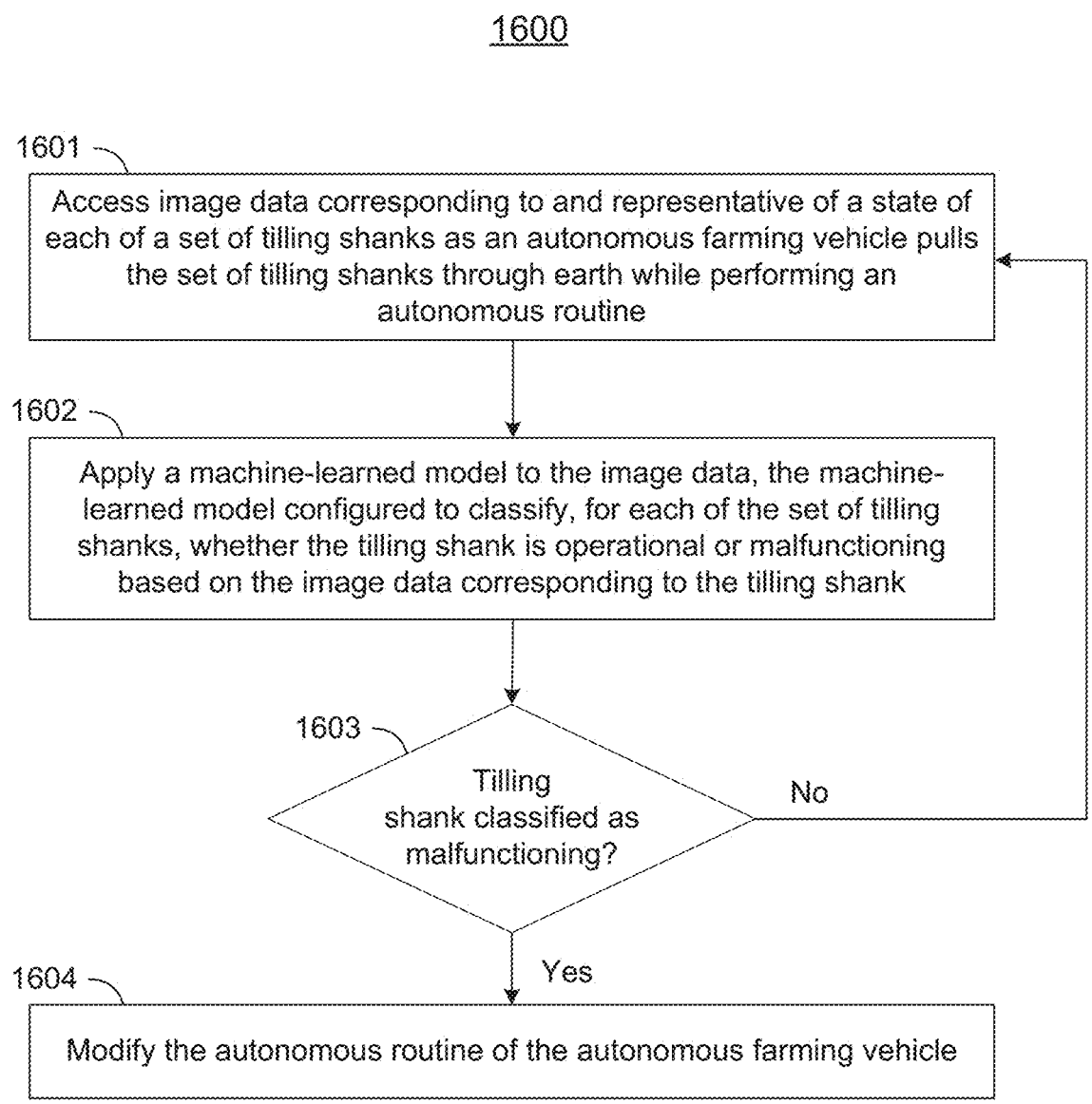
FIG. 16 is a flowchart illustrating a process for detecting a malfunctioning shank of an autonomous farming vehicle, in accordance with at least one embodiment.

FIG. 16 is a flowchart illustrating a process 1600 for detecting a malfunctioning shank of an autonomous farming vehicle. In some embodiments, the detection system 210 performs operations of the process 1600 in parallel or in different orders, or may perform different steps. For example, the process 1600 may include an additional step of preprocessing data accessed 1601. In another example, the process 1600 may include an additional block before proceeding to accessing 1601 (e.g., after the determination 1603 that a shank is not malfunctioning) to check that a predetermined period of time has passed before the detection system 210 checks for another malfunctioning shank.

The detection system 210 accesses 1601 image data corresponding to and representative of a state of each of a set of tilling shanks as an autonomous farming vehicle pulls the set of tilling shanks through earth while performing an autonomous routine. The detection system 210 may access 1601 the image data from the sensor records 250, where the image data may be obtained from the mono camera 221, the video camera 222, an RGB camera, or a combination thereof. The image data may capture reflectors as described in FIGS. 6-7 through the mono camera 221 or tilling patterns as described in FIG. 8 through the video camera 222.

The detection system 210 applies a machine-learned model to the image data, the machine-learned model configured to classify, for each of the set of tilling shanks, whether the tilling shank is operational or malfunctioning based on the image data corresponding to the tilling shank. The detection system 210 may apply a machine-learned model of the shank malfunction detection model 350 to the image data. The machine-learned model of the shank malfunction detection model 350 may classify reflectors represented in the data from the mono camera 221 or an RGB camera as operational or malfunctioning based on the shape of the light reflected from the markers or lack thereof (i.e., a marker will not be captured by the mono camera 221 if the shank has fallen off the tilling assembly). The shank malfunction detection model 350 may additionally classify a pattern of tilling streaks captured by the video camera 222, where the classified pattern corresponds to an indication of an operational or malfunctioning tilling shank.

The detection system 210 determines 1603 whether to classify a tilling shank as malfunctioning. The malfunction detection module 340 of the detection system 210 may perform additional decision making algorithms based on the outputs from the shank malfunction detection model 350 to determine 1703 whether to classify a tilling shank as malfunctioning. The malfunction detection module 340 may use one or more of the outputs from the shank malfunction detection model 350. For example, the tilling shank may be classified as malfunctioning based on the machine-learned model output from the mono camera 221 data input alone. In another example, the tilling shank may be classified as malfunctioning based on a combination of classifications from both the machine-learned model trained on mono camera or video camera data. The malfunction detection module 340 may apply weights to each model's output when determining whether a shank malfunctioned. If the detection system 210 determines that a shank is not malfunctioning, the process 1600 returns to accessing 1601 image data for subsequent detections of malfunctions. In some embodiments, the detection system 210 may check for malfunctions with a predetermined frequency (e.g., every two minutes). If the shank is malfunctioning, the process 1600 proceeds to modifying 1604 the autonomous routine of the vehicle.

The detection system 210 modifies 1604 the autonomous routine of the autonomous farming vehicle. For example, the detection system 210 provides instructions to a controller of the autonomous farming vehicle to pause or stop operations. In some embodiments, the detection system 210 may provide a notification to the monitoring system 110 or directly to another autonomous farming vehicle (e.g., the vehicle 141) to modify the routine of the other vehicle such that the route that the vehicle follows does not travel over an area of the field where a shank may be misplaced in the soil.

Figure 17:
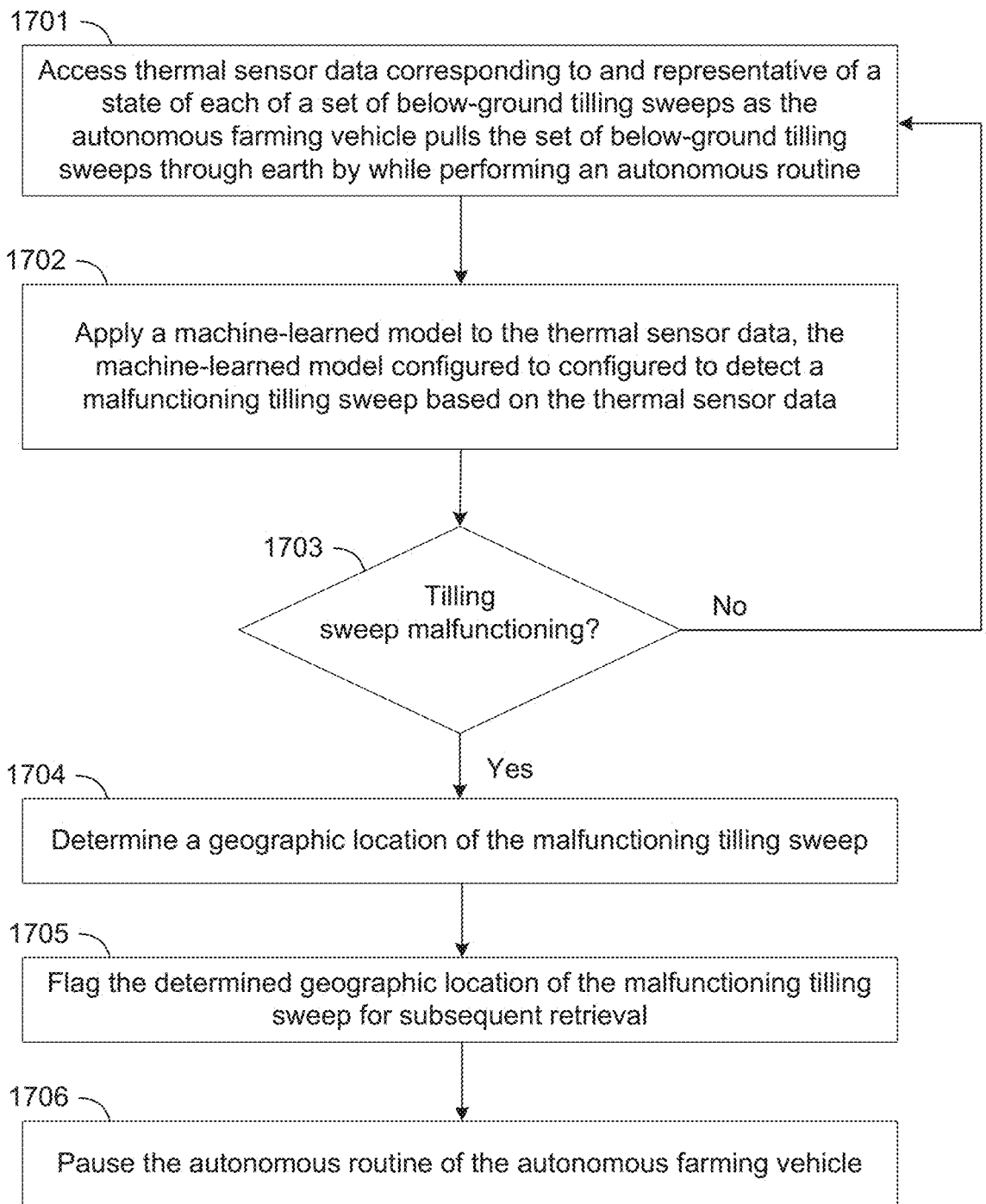
FIG. 17 is a flowchart illustrating a process for detecting a malfunctioning sweep of an autonomous farming vehicle, in accordance with at least one embodiment.

FIG. 17 is a flowchart illustrating a process 1700 for detecting a malfunctioning sweep of an autonomous farming vehicle. In some embodiments, the detection system 210 performs operations of the process 1700 in parallel or in different orders, or may perform different steps. For example, the process 1700 may include an additional step of preprocessing data accessed 1701. In another example, the process 1700 may include an additional block before proceeding to access 1701 thermal sensor data (e.g., after the determination 1703 that a sweep is not malfunctioning) to check that a predetermined period of time has passed before the detection system 210 checks for another malfunctioning sweep.

The detection system 210 accesses 1701 thermal sensor data corresponding to and representative of a state of each of a set of below-ground tilling sweeps as the autonomous farming vehicle pulls the set of below-ground tilling sweeps through earth by while performing an autonomous routine. The detection system 210 may access 1701 thermal sensor data captured by the thermal camera 223 of the tilling assembly's below-ground tilling sweeps as they are pulled through a field. Additionally, although not pictured, the detection system 210 may access data from other sensors such as the load cell 224, which measures data associated with a draft force required to pull the tilling assembly through the field.

The detection system 210 applies 1702 a machine-learned model to the thermal sensor data, the machine-learned model configured to configured to detect a malfunctioning tilling sweep based on the thermal sensor data. A machine-learned model of the sweep malfunction detection model 360 of the detection system 210 may be applied to the thermal sensor data and output an classification of detected shapes and the likelihood of the shape corresponding to the shape of an operational sweep. An example application of a machine-learned model of the sweep malfunction detection model 360 is depicted in FIGS. 9-10 and described in the corresponding descriptions.

The detection system 210 determines 1703 whether a tilling sweep is malfunctioning. The malfunction detection module 340 of the detection system 210 may perform additional decision making algorithms based on the outputs from the sweep malfunction detection model 360 to determine 1703 whether to classify a tilling sweep as malfunctioning. The malfunction detection module 340 may use one or more of the outputs from the sweep malfunction detection model 360. For example, the tilling sweep may be classified as malfunctioning based on the machine-learned model output from the thermal camera 223 data input alone. In another example, the tilling sweep may be classified as malfunctioning based on a combination of a classification from a machine-learned model trained on thermal sensor data and an estimation from a statistical model correlating load cell data to a likelihood of sweep malfunction. The malfunction detection module 340 may apply weights to each model's output when determining whether a sweep malfunctioned. If the detection system 210 determines that a sweep is not malfunctioning, the process 1700 returns to accessing 1701 thermal sensor data for subsequent detections of malfunctions. In some embodiments, the detection system 210 may check for malfunctions with a predetermined frequency (e.g., every two minutes). If the sweep is malfunctioning, the process 1700 proceeds to determining 1704 a geographic location of the malfunctioning tilling sweep.

The detection system 210 determines 1704 a geographic location of the malfunctioning tilling sweep. The autonomous farming vehicle 140 may be equipped with tracking module such as a GPS tracking unit that may be used by the detection system 210 to determine a location to associate a detected malfunction with. The data captured by the sensors 220 may be annotated with a time and GPS coordinates so that the detection system 210 may determine when and where the malfunction associated with the accessed 1701 thermal sensor data occurred. Alternatively, the detection system 210 may use the GPS location of the autonomous farming vehicle 140 at the time at which the determination 1703 was made (e.g., if the sensor data is not otherwise annotated with metadata to determine a more accurate location and time associated with the malfunction).

The detection system 210 flags 1705 the determined geographic location of the malfunctioning tilling sweep for subsequent retrieval. For example, the detection system 210 may generate a notification that identifies the determined geographic location and the malfunctioning sweep. The detection system 210 may transmit the notification (e.g., via the network 130) to the monitoring system 110. The monitoring system 110 may then display the detected malfunction along with the associated location in the field (e.g., using GUI 1500 of FIG. 15).

The detection system 210 pauses 1706 the autonomous routine of the autonomous farming vehicle. For example, the detection system 210 provides instructions to a controller of the autonomous farming vehicle to pause operations. In some embodiments, the detection system 210 may provide a notification to the monitoring system 110 or directly to another autonomous farming vehicle (e.g., the vehicle 141) to modify the routine of the other vehicle such that the route that the vehicle follows does not travel over an area of the field where a sweep may be misplaced in the soil.

Figure 18:
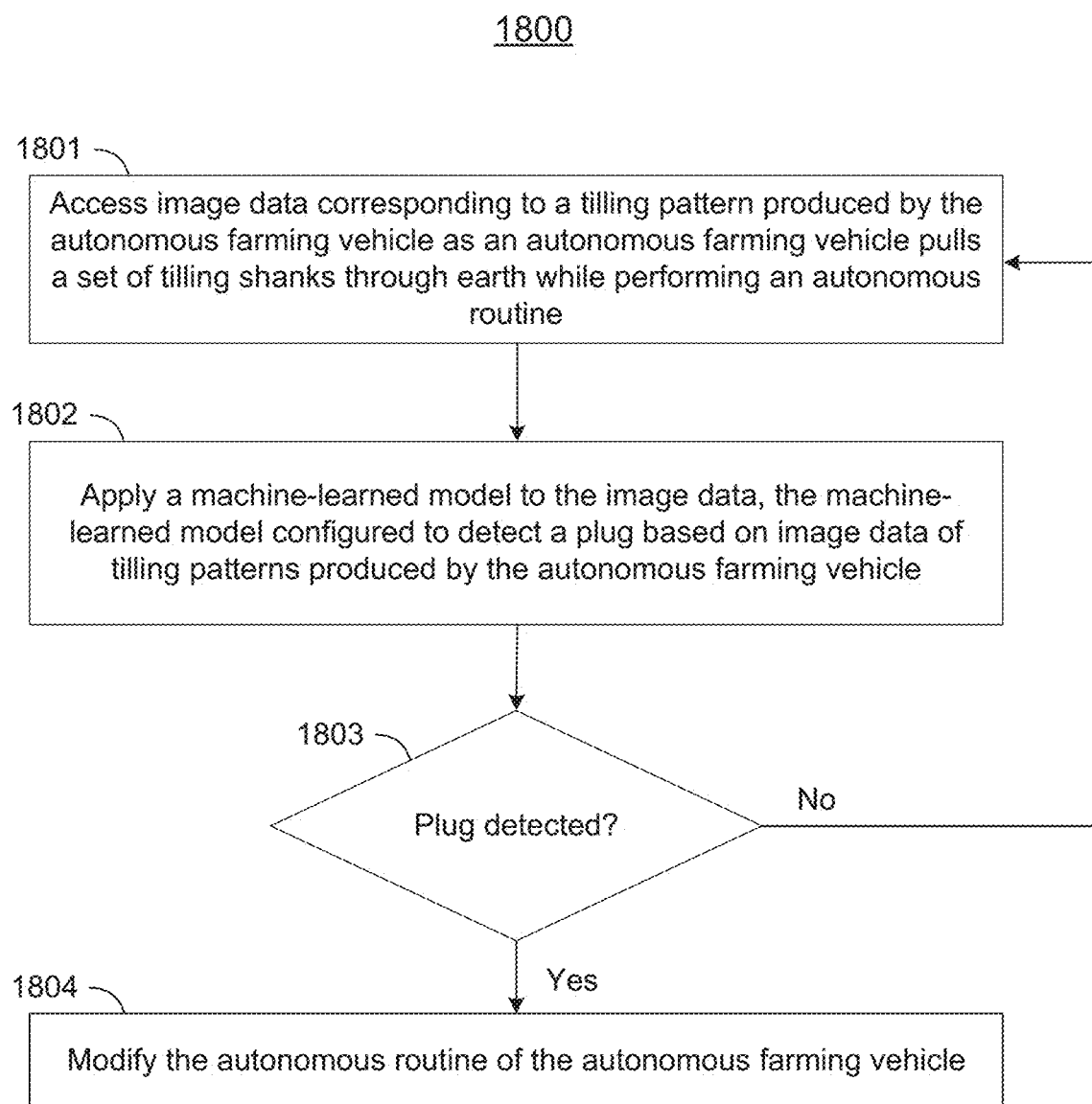
FIG. 18 is a flowchart illustrating a process for detecting a plug within a tilling assembly of an autonomous farming vehicle, in accordance with at least one embodiment.

FIG. 18 is a flowchart 1800 illustrating a process for detecting a plug within a tilling assembly of an autonomous farming vehicle. In some embodiments, the detection system 210 performs operations of the process 1800 in parallel or in different orders, or may perform different steps. For example, the process 1800 may include an additional step of preprocessing data accessed 1801. In another example, the process 1800 may include an additional block before proceeding to access 1801 thermal sensor data (e.g., after the determination 1803 that a plug was not detected) to check that a predetermined period of time has passed before the detection system 210 checks for another plug within the tilling assembly.

The detection system 210 accesses 1801 image data corresponding to a tilling pattern produced by the autonomous farming vehicle as an autonomous farming vehicle pulls a set of tilling shanks through earth while performing an autonomous routine. The detection system 210 may access data captured by the video camera 222 of tilling streaks within a field that are produced by the shank assemblies pulled through the earth by the autonomous farming vehicle. Although not depicted, the process 1800 may also access data from other sensors such as the ultrasonic sensor 225 or the distance sensor 226 to input into a statistical model to determine a likelihood that a plug was detected within the tilling assembly of the autonomous farming vehicle.

The detection system 210 applies 1802 a machine-learned model to the image data, the machine-learned model configured to detect a plug based on image data of tilling patterns produced by the autonomous farming vehicle. A machine-learned model of the plug detection model 370 may be applied to the image data to classify whether the tilling pattern depicted in the image data is indicative of a plug between tilling shanks.

The detection system 210 determines 1803 whether a plug has been detected. The malfunction detection module 340 of the detection system 210 may perform additional decision making algorithms based on the outputs from the plug detection model 370 to determine 1803 whether to classify a plug as detected based on the tilling pattern in the image data. The malfunction detection module 340 may use one or more of the outputs from the sweep malfunction detection model 360. For example, the plug may be classified as present between tilling shanks based on the machine-learned model output from the video camera 222 data input alone. In another example, the plug may be detected based on a combination of a classification from a machine-learned model trained on video camera data and an estimation from a statistical model correlating ultrasonic sensor or distance sensor data to a likelihood of a plug within the tilling assembly. The malfunction detection module 340 may apply weights to each model's output when determining whether a plug is detected. If the detection system 210 determines that a plug is not detected, the process 1800 returns to accessing 1801 image data for subsequent detections of plugs. In some embodiments, the detection system 210 may check for plugs with a predetermined frequency (e.g., every two minutes). If the plug is detected, the process 1800 proceeds to modifying 1804 the autonomous routine of the autonomous farming vehicle.

The detection system 210 modifies 1804 the autonomous routine of the autonomous farming vehicle. For example, the detection system 210 provides instructions to a controller of the autonomous farming vehicle to pause or stop operations. In some embodiments, the detection system 210 may provide a notification to the monitoring system 110 or directly to another autonomous farming vehicle (e.g., the vehicle 141) to modify the routine of the other vehicle such that other vehicle tills the area of the field where the detected plug caused the area to be unsuccessfully tilled.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., computer) readable storage medium such as a read only memory ("ROM"), random access memory ("RAM"), magnetic disk storage media, optical storage media, flash memory devices, etc.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method of detecting plugs between tilling shanks by an autonomous farming vehicle, comprising:
   accessing, in real-time, image data corresponding to a tilling pattern produced by the autonomous farming vehicle as the autonomous farming vehicle pulls a set of tilling shanks through earth while performing an original autonomous routine;
   applying a machine-learned model to the image data, the machine-learned model trained on training image data representative of tilling patterns produced by sets of plugged tilling shanks and tilling patterns produced by sets of unplugged tilling shanks, the machine-learned model configured to detect a plug or an absence of a plug based on the image data corresponding to the tilling pattern produced by the autonomous farming vehicle;
   in response to detecting a plug, performing a modified autonomous routine of the autonomous farming vehicle to remove the plug from the set of tilling shanks;
   accessing additional image data as the autonomous farming vehicle pulls the set of tilling shanks through earth while performing the modified autonomous routine; and
   verifying, using the additional image data, the plug is absent from the set of tilling shanks.

2. The method of claim 1, further comprising:
   accessing, in real-time, through-beam sensor data from a through-beam sensor comprising an emitter and a receiver coupled to a first and a second tilling shank, respectively, of the set of tilling shanks; and
   determining a measure of a signal transmitted by the emitter and received at the receiver is below a threshold level indicative of the plug in between the first and second tilling shanks.

3. The method of claim 2, further comprising:
   determining a location of the plug among the set of tilling shanks based on an identifier associated with the through-beam sensor of a plurality of through-beam sensors coupled to the set of tilling shanks.

4. The method of claim 1, further comprising:
   accessing, in real-time, ultrasonic sensor data from an ultrasonic sensor coupled to a tilling shank of the set of tilling shanks, the ultrasonic sensor configured to indicate a distance between the tilling shank and another tilling shank of the set of tilling shanks; and
   determining a measure of a signal received by the ultrasonic sensor is below a threshold level indicative of a plug in between the tilling shank and the other tilling shank.

5. The method of claim 4, further comprising:
   determining a location of the plug among the set of tilling shanks based on an identifier associated with the ultrasonic sensor of a plurality of ultrasonic sensors coupled to the set of tilling shanks.

6. The method of claim 1, further comprising:
   creating a training set comprising training tilling pattern images, each training tilling pattern image associated with a plug or associated with no plug; and
   training the machine-learned model using the training set.

7. The method of claim 6, wherein each image of the training tilling pattern images is associated with one or more plugs within the set of tilling shanks and a location of each plug within the set of tilling shanks.

8. The method of claim 6, wherein the training tilling pattern images are captured by a plurality of autonomous farming vehicles operating in a plurality of environmental conditions.

9. The method of claim 1, wherein modifying the autonomous routine of the autonomous farming vehicle comprises pausing the autonomous routine.

10. The method of claim 1, further comprising:
    accessing load cell data from a load cell sensor coupled to the set of tilling shanks, the load cell data associated with a plurality of draft forces associated with pulling the set of tilling shanks through the earth; and
    in response to determining the plurality of draft forces exceeds a baseline draft force associated with pulling the set of tilling shanks free of plugs, determining that a plug is present.

11. The method of claim 10, further comprising:
    determining a weighted score based on the load cell data and a classification by the machine-learned model; and
    detecting the plug based on the weighted score.

12. The method of claim 1, further comprising:
    accessing environmental data representative of a plurality of conditions under which the autonomous farming vehicle performs the autonomous routine;
    applying a statistical model to the environmental data, the statistical model configured to estimate a likelihood of detecting the plug based on the environmental data; and
    detecting the plug further based on the application of the statistical model.

13. The method of claim 12, wherein the environmental data comprises a time, a temperature, or soil moisture level.

14. The method of claim 1, further comprising:
    determining a geographic location where the plug is detected;
    determining whether a threshold number of plugs have been detected at the geographic location; and
    in response to determining that the threshold number of detections has occurred at the geographic location:
      generating a notification identifying the geographic location, and
      transmitting the notification to a remote monitoring system.

15. The method of claim 1, wherein verifying the plug is removed from the set of tilling shanks further comprises:
    transmitting the additional image data indicating the plug is removed from the set of tilling shanks to a user of the autonomous farming vehicle; and
    receiving instructions for the autonomous farming vehicle to perform the original autonomous routine.

16. The method of claim 1, wherein verifying the plug is removed from the set of tilling shanks further comprises:
    applying the machine-learned model to the additional image data, the machine-learned model additionally configured to determine the plug is absent from the set of tilling shanks based on the image data corresponding to tilling patterns produced by the autonomous farming vehicle; and
    in response to determining the plug is removed from the set of tilling shanks, performing the original autonomous routine of the autonomous farming vehicle.

17. A method of detecting plugs between tilling shanks by an autonomous farming vehicle, comprising:
    accessing, in real-time, image data corresponding to a tilling pattern produced by the autonomous farming vehicle as the autonomous farming vehicle pulls a set of tilling shanks through earth while performing an autonomous routine;

applying a machine-learned model to the image data, the machine-learned model trained on training image data representative of tilling patterns produced by sets of plugged tilling shanks and tilling patterns produced by sets of unplugged tilling shanks, the machine-learned model configured to detect a plug based on the image data corresponding to the tilling pattern produced by the autonomous farming vehicle wherein applying the machine-learned model to the image data comprises:
  detecting a number of tilling streaks in the tilling pattern identifiable in the image data,
  comparing the number of the detected tilling streaks to an expected number of tilling streaks, and
  detecting the plug based on the comparison; and in response to detecting a plug, modifying the autonomous routine of the autonomous farming vehicle.

18. A method of detecting plugs between tilling shanks by an autonomous farming vehicle, comprising:
  accessing, in real-time, image data corresponding to a tilling pattern produced by the autonomous farming vehicle as the autonomous farming vehicle pulls a set of tilling shanks through earth while performing an autonomous routine;
  accessing equipment data representative of an arrangement of the set of tilling shanks, wherein the arrangement of the set of tilling shanks comprises a minimum spacing between each tilling shank of the set of tilling shanks;
  applying a statistical model the equipment data, the statistical model configured to estimate a likelihood of detecting the plug based on the equipment data;
  applying a machine-learned model to the image data, the machine-learned model trained on training image data representative of tilling patterns produced by sets of plugged tilling shanks and tilling patterns produced by sets of unplugged tilling shanks, the machine-learned model configured to detect a plug based on the image data corresponding to the tilling pattern produced by the autonomous farming vehicle; and
  in response to detecting a plug based on an output of the machine-learned model and the likelihood determined by the statistical model, modifying the autonomous routine of the autonomous farming vehicle.

19. The method of claim 18, further comprising:
determining a first location corresponding to where the plug is first detected;
determining a second location corresponding to where the plug is determined to be absent; and
modifying the autonomous routine to include tilling a path defined in the autonomous routine, the path between the first location and the second location.

20. A detection system for an autonomous farming vehicle configured to perform steps comprising:
  accessing, in real-time, image data corresponding to a tilling pattern produced by the autonomous farming vehicle as the autonomous farming vehicle pulls a set of tilling shanks through earth while performing an original autonomous routine;
  applying a machine-learned model to the image data, the machine-learned model trained on training image data representative of tilling patterns produced by sets of plugged tilling shanks and tilling patterns produced by sets of unplugged tilling shanks, the machine-learned model configured to detect a plug based on the image data corresponding to the tilling pattern produced by the autonomous farming vehicle;
  in response to detecting a plug, performing a modified autonomous routine of the autonomous farming vehicle to remove the plug from the set of tilling shanks;
  accessing additional image data as the autonomous farming vehicle pulls the set of tilling shanks through earth while performing the modified autonomous routine; and
  verifying, using the additional image data, the plug is absent from the set of tilling shanks.

21. A non-transitory computer readable storage medium storing executable instructions that, when executed by one or more processors, cause the one or more processors to perform steps comprising:
  accessing, in real-time, image data corresponding to a tilling pattern produced by an autonomous farming vehicle as the autonomous farming vehicle pulls a set of tilling shanks through earth while performing an original autonomous routine;
  applying a machine-learned model to the image data, the machine-learned model trained on training image data representative of tilling patterns produced by sets of plugged tilling shanks and tilling patterns produced by sets of unplugged tilling shanks, the machine-learned model configured to detect a plug based on the image data corresponding to the tilling pattern produced by the autonomous farming vehicle;
  in response to detecting a plug, performing a modified autonomous routine of the autonomous farming vehicle to remove the plug from the set of tilling shanks;
  accessing additional image data as the autonomous farming vehicle pulls the set of tilling shanks through earth while performing the modified autonomous routine; and
  verifying, using the additional image data, the plug is absent from the set of tilling shanks.

* * * * *